United States Patent
Su et al.

(10) Patent No.: US 10,822,359 B2
(45) Date of Patent: Nov. 3, 2020

(54) BENZOTRIAZOLE DERIVATIVE, PREPARATION PROCESS AND THE USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Shuo Su, Beijing (CN); Jun Long, Beijing (CN); Qinghua Duan, Beijing (CN); Hui Zhang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 56 days.

(21) Appl. No.: 16/097,092

(22) PCT Filed: Apr. 25, 2017

(86) PCT No.: PCT/CN2017/000325
§ 371 (c)(1),
(2) Date: Oct. 26, 2018

(87) PCT Pub. No.: WO2017/185819
PCT Pub. Date: Nov. 2, 2017

(65) Prior Publication Data
US 2019/0106446 A1 Apr. 11, 2019

(30) Foreign Application Priority Data
Apr. 27, 2016 (CN) .......................... 2016 1 0269549

(51) Int. Cl.
| | | |
|---|---|---|
| *C07F 9/6518* | (2006.01) | |
| *C10M 137/10* | (2006.01) | |
| *C10M 169/04* | (2006.01) | |
| *C10N 30/06* | (2006.01) | |
| *C10N 30/10* | (2006.01) | |
| *C10N 30/12* | (2006.01) | |

(52) U.S. Cl.
CPC ......... *C07F 9/6518* (2013.01); *C10M 137/10* (2013.01); *C10M 169/04* (2013.01); *C10M 2223/047* (2013.01); *C10N 2030/06* (2013.01); *C10N 2030/10* (2013.01); *C10N 2030/12* (2013.01)

(58) Field of Classification Search
CPC ............ C10N 2230/12; C10N 2230/06; C10N 2230/10; C10N 2030/04; C10M 2223/047; C10M 137/10; C10M 169/04; C10M 137/105; C10M 2215/223; C10M 2215/04; C07F 9/6518
See application file for complete search history.

(56) References Cited

U.S. PATENT DOCUMENTS

| | | |
|---|---|---|
| 2,736,707 A | 2/1956 | Morris |
| 4,405,470 A | 9/1983 | Okorodudu |
| 9,296,973 B2 | 3/2016 | Fu et al. |
| 2015/0051128 A1 | 2/2015 | Kiko et al. |

FOREIGN PATENT DOCUMENTS

| | | |
|---|---|---|
| CN | 1033811 A | 7/1989 |
| CN | 1084517 A | 3/1994 |
| CN | 1161970 A | 10/1997 |
| CN | 1237158 C | 1/2006 |
| CN | 1715381 A | 1/2006 |
| CN | 102260572 A | 11/2011 |
| CN | 102690717 A | 9/2012 |
| CN | 102766506 B | 10/2014 |
| EP | 1054052 A2 | 11/2000 |
| RU | 2249589 C1 | 4/2005 |

OTHER PUBLICATIONS

Sun, Xiang-Dong et al., "Synthesis of Benzotriazole Aliphatic Amine Derivative by Mannich Reaction and Its Performance", Journal of Petrochemical Universities, Sep. 2003, vol. 16, No. 3.
Russian federal institute of industrial property, Office Action of RU 2018141361, dated Jun. 8, 2020.
Russian federal institute of industrial property, Search Report of RU 2018141361, dated Jun. 8, 2020.

*Primary Examiner* — Vishal V Vasisth
(74) *Attorney, Agent, or Firm* — Novick, Kim & Lee, PLLC; Allen Xue

(57) ABSTRACT

The present invention relates to a benzotriazole derivative, a preparation process thereof and the use thereof in preparation of the lubricating oil composition. The structure of the benzotriazole derivative of the present invention is shown by general formula (I). The benzotriazole derivative of the present invention, as the anti-wear additive for lubricating oil, not only has an excellent extreme pressure anti-wear property, but also has one or more excellent properties of thermal oxidation stability, corrosion resistance, rust resistance and anti-friction performance.

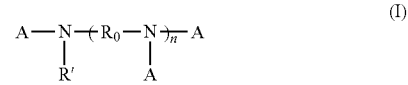

In the general formula (I), each of the group(s) and the number(s) are defined as in the description.

10 Claims, No Drawings

BENZOTRIAZOLE DERIVATIVE, PREPARATION PROCESS AND THE USE THEREOF

This application is a 371 of PCT/CN2017/000325, filed Apr. 25, 2017.

TECHNICAL FIELD

The present invention relates to a benzotriazole derivative, in particular to a benzotriazole derivative suitable as lubricating oil additive. The present invention also relates to a process for preparing said benzotriazole derivative and its use in preparing a lubricating oil composition.

BACKGROUND

The anti-wear property of lubricating oils has always been one of the most important performance indicators of lubricating oils. To this end, various lubricating oil additives have been developed in the prior art. In recent years, with the improvement of environmental protection requirements and the extension of oil change intervals, higher requirements are imposed on the performance (including the anti-wear property) of the lubricating oil additives.

Chinese patent application CN1161970A discloses a process for preparing a thiophosphate ester amine salt by reacting a sulfide, a phosphite, an alipatic amine, a boride and formaldehyde. According to the patent application, the produced thiophosphate ester amine salt can be used as a lubricating oil additive and exhibits excellent extreme pressure and anti-wear properties.

However, the prior art still requires a lubricating oil additive which not only has excellent extreme pressure and anti-wear properties, but also has one or more excellent properties of thermal oxidation stability, corrosion resistance, rust resistance and anti-friction performance.

SUMMARY OF THE INVENTION

The present inventors, on the basis of the prior art, have found a novel benzotriazole derivative, and further have found that, by using the benzotriazole derivative as lubricating oil additive, the aforesaid problems in the prior art can be solved, and then this invention is achieved.

Specifically, the present invention involves the following aspects.

1. A benzotriazole derivative, which has a structural formula (I) as shown below:

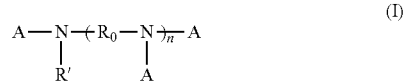

(I)

In the general formula (I), the group R' is selected from $C_{1-25}$hydrocarbyl, $C_{3-25}$linear or branched heteroalkyl and hydrocarbyl having a number-average molecular weight Mn of 300-3000 (preferably 500-2000, more preferably 500-1500), or is selected from $C_{1-20}$hydrocarbyl and $C_{3-20}$linear or branched heteroalkyl, preferably selected from $C_{10-25}$linear or branched alkyl, $C_{10-25}$linear or branched alkenyl, $C_{10-25}$linear or branched alkynyl, $C_{10-25}$linear or branched heteroalkyl and polyisobutenyl having a number-average molecular weight Mn of 300-3000 (preferably 500-2000, more preferably 500-1500), more preferably $C_{10-25}$linear or branched alkyl; n is selected from an integer of 0-10, preferably selected from an integer of 0-5, more preferably 0; n groups $R_0$ are identical to or different from each other and each independently selected from $C_{1-10}$linear or branched alkylene, preferably each independently selected from $C_{2-5}$linear or branched alkylene; n+2 groups A are identical to or different from each other and each independently selected from hydrogen, the group represented by formula (I-1), the group represented by formula (I-2), $C_{1-25}$hydrocarbyl and hydrocarbyl having a number-average molecular weight Mn of 300-3000 (preferably 500-2000, more preferably 500-1500), preferably each independently selected from hydrogen, the group represented by formula (I-1), the group represented by formula (I-2), $C_{1-6}$linear or branched alkyl, $C_{10-25}$linear or branched alkyl, $C_{10-25}$linear or branched alkenyl and polyisobutenyl having a number-average molecular weight Mn of 300-3000 (preferably 500-2000, more preferably 500-1500), preferably each independently selected from hydrogen, the group represented by formula (I-1), the group represented by formula (I-2) and $C_{1-4}$linear or branched alkyl, preferably each independently selected from hydrogen, the group represented by formula (I-1) and the group represented by formula (I-2), provided that at least one of said n+2 groups A is the group represented by formula (I-1), and at least one of said n+2 groups A is the group represented by formula (I-2); if said at least one group A is $C_{10-25}$linear or branched alkyl, $C_{10-25}$linear or branched alkenyl or hydrocarbyl having a number-average molecular weight Mn of 300-3000 (preferably 500-2000, more preferably 500-1500), said group R' may also be hydrogen,

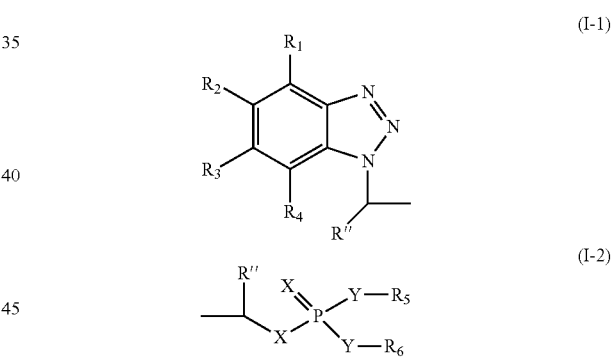

in the general formula (I-1) and the general formula (I-2), the groups $R_5$ and $R_6$ are identical to or different from each other and each independently selected from $C_{1-20}$hydrocarbyl (particularly $C_{1-20}$linear or branched alkyl), preferably each independently selected from $C_{1-15}$linear or branched alkyl, more preferably each independently selected from $C_{3-12}$linear or branched alkyl; the groups X and Y are identical to or different from each other and each independently selected from oxygen atom and sulfur atom, preferably two groups X are both sulfur atoms, two groups Y are both oxygen atoms; two groups R" are identical to or different from each other and each independently selected from hydrogen and $C_{1-20}$hydrocarbyl, preferably each independently selected from hydrogen and $C_{1-20}$linear or branched alkyl, more preferably each independently selected from hydrogen and $C_{1-6}$linear or branched alkyl, more preferably both hydrogen; groups $R_1$, $R_2$, $R_3$ and $R_4$ are identical to or different from each other and each independently selected from hydrogen and $C_{1-20}$hydrocarbyl, preferably each independently selected from hydrogen and $C_{1-10}$linear or branched alkyl, more preferably $R_1$ and $R_4$ are both hydrogen, one of $R_2$ and $R_3$ is $C_{1-10}$linear or branched alkyl (preferably $C_{1-6}$linear or branched alkyl), the other is hydrogen, said linear or branched heteroalkyl refers to a group obtained by inserting the carbon-chain structure of the linear or branched alkyl with one or more (for example 1-5, 1-4, 1-3, 1-2 or 1) hetero groups selected from —O—, —S— and —NR— (wherein the group R is selected from H and $C_{1-4}$linear or branched alkyl, preferably selected from H and methyl).

2. Benzotriazole derivative according to any of the preceded aspects, which is selected from the following specific compounds or a mixture of two or more of the following specific compounds:

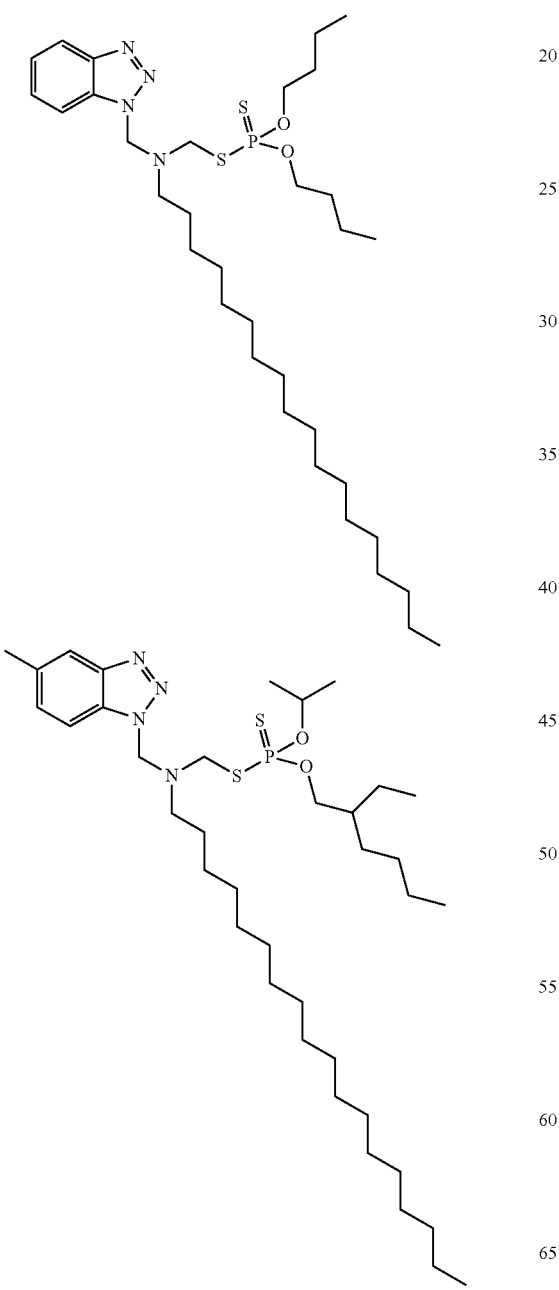

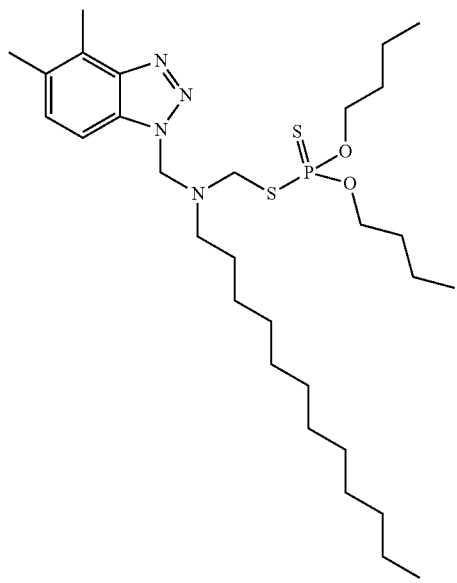

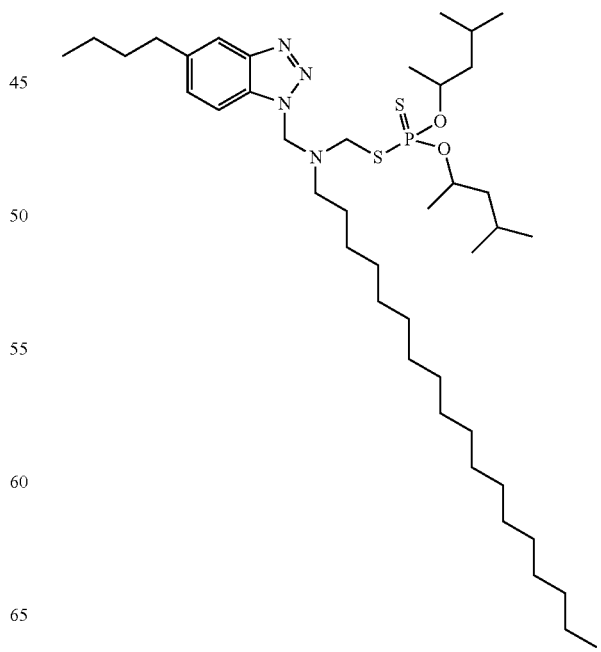

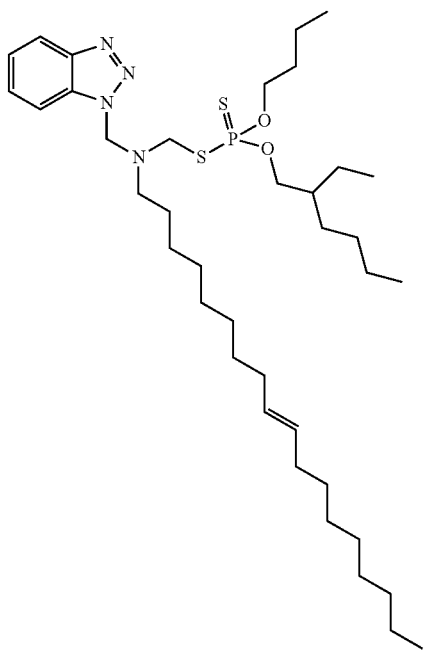
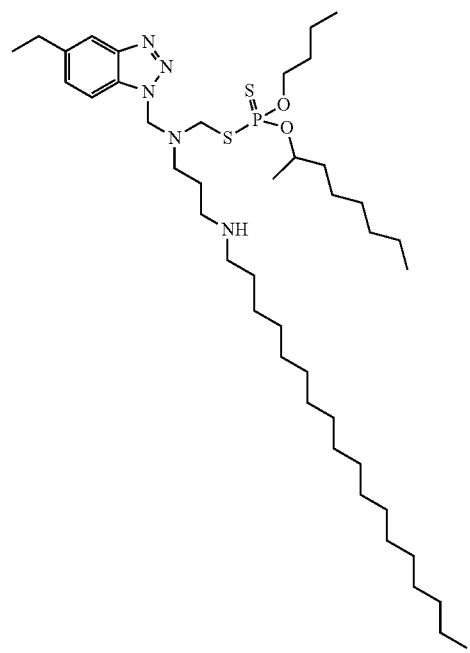
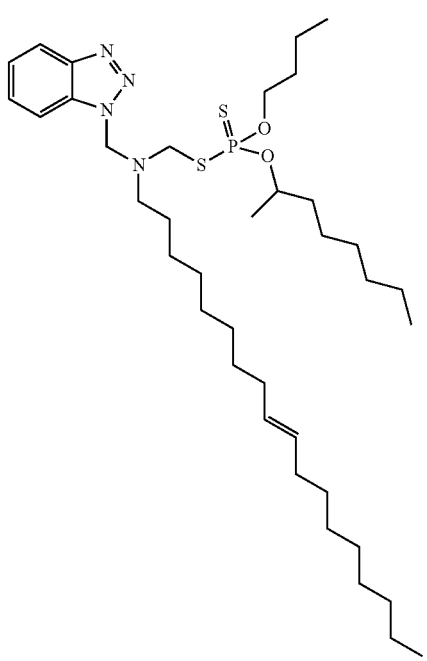
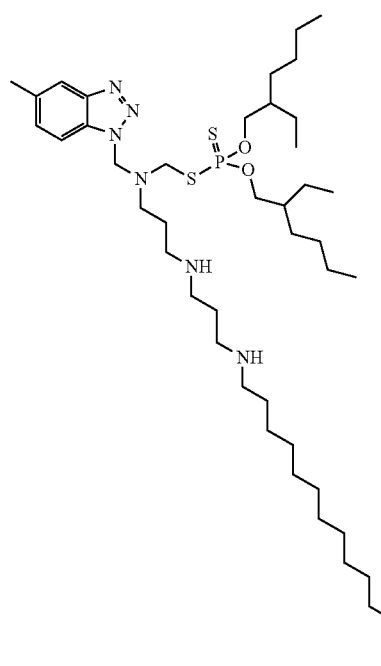

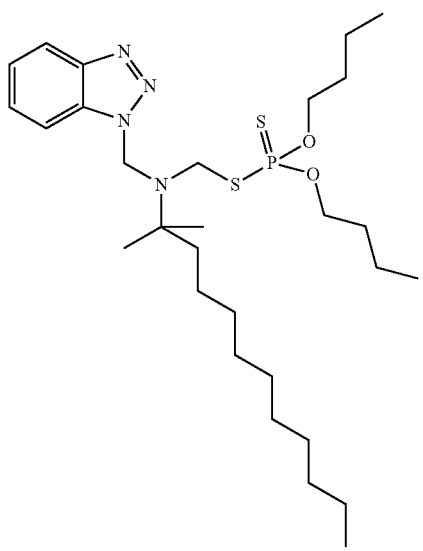
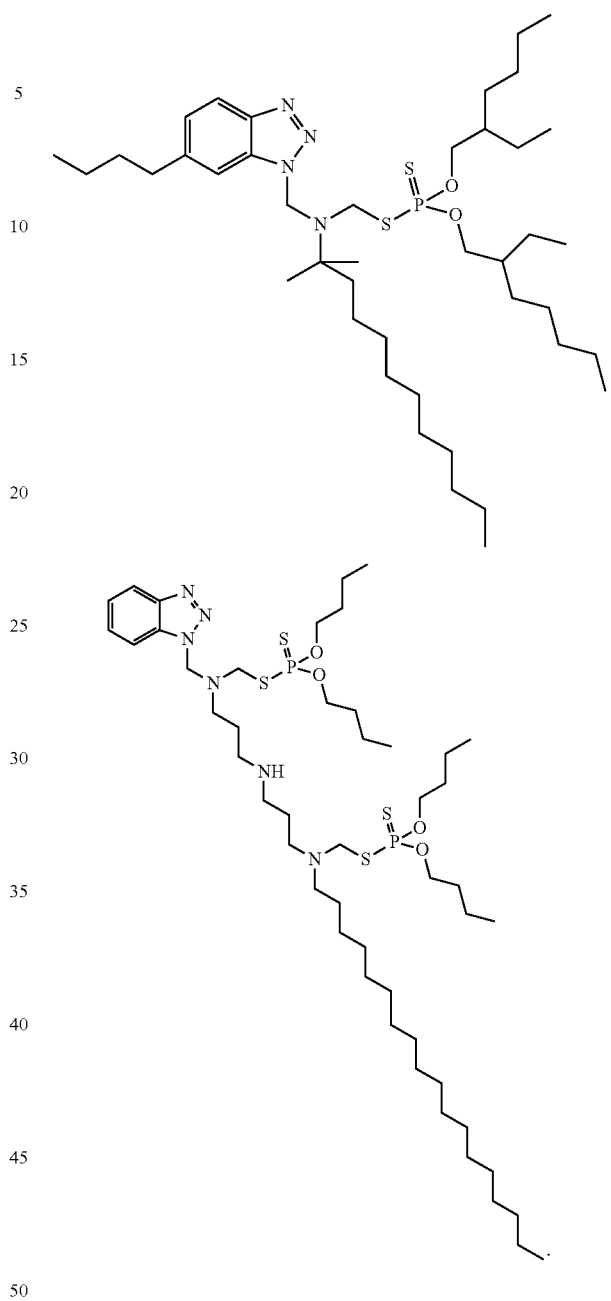
3. A process for preparing a benzotriazole derivative, comprises the step of reacting the phosphorus compound represented by formula (I-A), the amine compound represented by formula (I-B) and the benzotriazole compound represented by formula (I-C) in presence of the aldehyde represented by formula (I-D),
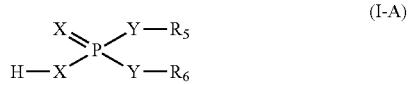
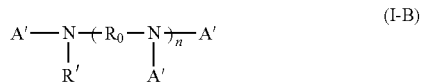

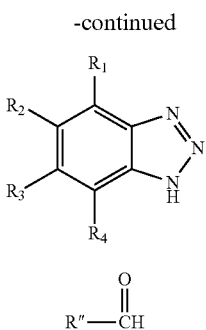

wherein the group R' is selected from $C_{1-25}$hydrocarbyl, $C_{3-25}$linear or branched heteroalkyl and hydrocarbyl having a number-average molecular weight Mn of 300-3000 (preferably 500-2000, more preferably 500-1500), or is selected from $C_{1-20}$hydrocarbyl and $C_{3-20}$linear or branched heteroalkyl, preferably selected from $C_{10-25}$linear or branched alkyl, $C_{10-25}$linear or branched alkenyl, $C_{10-25}$linear or branched alkynyl, $C_{10-25}$linear or branched heteroalkyl and polyisobutenyl having a number-average molecular weight Mn of 300-3000 (preferably 500-2000, more preferably 500-1500), more preferably $C_{10-25}$linear or branched alkyl; n is selected from an integer of 0-10, preferably selected from an integer of 0-5, more preferably 0; n groups $R_0$ are identical to or different from each other and each independently selected from $C_{1-10}$linear or branched alkylene, preferably each independently selected from $C_{2-5}$linear or branched alkylene; n+2 groups A' are identical to or different from each other and each independently selected from hydrogen, $C_{1-25}$hydrocarbyl and hydrocarbyl having a number-average molecular weight Mn of 300-3000 (preferably 500-2000, more preferably 500-1500), preferably each independently selected from hydrogen, $C_{1-6}$linear or branched alkyl, $C_{10-25}$linear or branched alkyl, $C_{10-25}$linear or branched alkenyl and polyisobutenyl having a number-average molecular weight Mn of 300-3000 (preferably 500-2000, more preferably 500-1500), preferably each independently selected from hydrogen and $C_{1-4}$linear or branched alkyl, provided that at least two of said n+2 groups A' represent hydrogen; if said at least one group A' is $C_{10-25}$linear or branched alkyl, $C_{10-25}$linear or branched alkenyl or hydrocarbyl having a number-average molecular weight Mn of 300-3000 (preferably 500-2000, more preferably 500-1500), said group R' may also be hydrogen; the groups $R_5$ and $R_6$ are identical to or different from each other and each independently selected from $C_{1-20}$hydrocarbyl (particularly $C_{1-20}$linear or branched alkyl), preferably each independently selected from $C_{1-15}$linear or branched alkyl, more preferably each independently selected from $C_{3-12}$linear or branched alkyl; the groups X and Y are identical to or different from each other and each independently selected from oxygen atom and sulfur atom, preferably two groups X are both sulfur atoms, two groups Y are both oxygen atoms; the group R'' is selected from hydrogen and $C_{1-20}$hydrocarbyl, preferably selected from hydrogen and $C_{1-20}$linear or branched alkyl, more preferably selected from hydrogen and $C_{1-6}$linear or branched alkyl, more preferably hydrogen; groups $R_1$, $R_2$, $R_3$ and $R_4$ are identical to or different from each other and each independently selected from hydrogen and $C_{1-20}$hydrocarbyl, preferably each independently selected from hydrogen and $C_{1-10}$linear or branched alkyl, more preferably $R_1$ and $R_4$ are both hydrogen, one of $R_2$ and $R_3$ is $C_{1-10}$linear or branched alkyl (preferably $C_{1-6}$linear or branched alkyl), the other is hydrogen, said linear or branched heteroalkyl refers to a group obtained by inserting the carbon-chain structure of the linear or branched alkyl with one or more (for example 1-5, 1-4, 1-3, 1-2 or 1) hetero groups selected from —O—, —S— and —NR— (wherein the group R is selected from H and $C_{1-4}$linear or branched alkyl, preferably selected from H and methyl).

4. The preparation process according to any of the preceded aspects, wherein the reaction time of said reaction is 0.1-24 h, preferably 0.5-6 h, and the reaction temperature of said reaction is 0-250° C., preferably 60-120° C.

5. The preparation process according to any of the preceded aspects, wherein the molar ratio of said phosphorus compound represented by formula (I-A) to said amine compound represented by formula (I-B) is 1:0.1-10, preferably 1:0.6-1.5; the molar ratio of said phosphorus compound represented by formula (I-A) to said benzotriazole compound represented by formula (I-C) is 1:0.1-10, preferably 1:0.6-1.5; the molar ratio of said phosphorus compound represented by formula (I-A) to said aldehyde represented by formula (I-D) is 1:1-10, preferably 1:2-4.

6. Use of benzotriazole derivative according to any of the preceded aspects or benzotriazole derivative obtained by the preparation process according to any of the preceded aspects as lubricating oil additive (for example the anti-wear additive for lubricating oil).

7. A lubricating oil composition, containing a base oil for lubricating oil, and benzotriazole derivative according to any of the preceded aspects or benzotriazole derivative obtained by the preparation process according to any of the preceded aspects.

8. The lubricating oil composition according to any of the preceded aspects, wherein on the weight basis, said benzotriazole derivative is 0.001-30%, preferably 0.1-10% by the total weight of said lubricating oil composition.

Technical Effects

The benzotriazole derivative according to the present invention is free of metal component, and is not apt to produce ashes and deposits, and is an environment-friendly lubricating oil additive.

The benzotriazole derivative according to the present invention, compared with the prior art lubricating oil additive, shows remarkably improved anti-wear and extreme pressure properties, and can effectively improve anti-wear property and the carrying capability of the lubricating oil.

The benzotriazole derivative according to the present invention, in a preferable embodiment, not only shows an excellent anti-wear property, but also further shows excellent thermal oxidation stability (thermal stability). This is not the case for the lubricating oil additive in the prior art.

The benzotriazole derivative according to the present invention, in a preferable embodiment, not only shows an excellent anti-wear property, but also further shows excellent corrosion resistance. This is not the case for the lubricating oil additive in the prior art.

The benzotriazole derivative according to the present invention, in a preferable embodiment, not only shows an excellent anti-wear property, but also further shows excellent rust resistance. This is not the case for the lubricating oil additive in the prior art.

The benzotriazole derivative according to the present invention, in a preferable embodiment, not only shows an excellent anti-wear property, but also further shows excellent anti-friction performance. This is not the case for the lubricating oil additive in the prior art.

The process for preparing benzotriazole derivative according to the present invention has characteristics of simple process, no waste gas emission, low waste water emission, safety, environmental protection and the like.

DETAILED DESCRIPTION OF THE INVENTION

This invention will be described in details hereinafter with reference to the following specific embodiments. However, it should be noted that the protection scope of this invention should not be construed as limited to these specific embodiments, but rather determined by the attached claims.

All of publication documents, patent applications, patents and other reference documents mentioned in the present description are incorporated herein by reference in its entirety unless expressly excluded or otherwise limited. Further, to the extent that any meaning or definition of a term in the present description conflicts with any meaning or definition of the same term in a document incorporated by reference, the meaning or definition assigned to that term in the present description shall govern.

In the context of this invention, when an expression like "conventionally known in this field" or "conventionally used in this field" or the like is used to describe/define an item like a material, a process, a part, an apparatus or a device, it means that this item (1) has been well known for a similar purpose in this field before this application, or (2) has not been that much well known for a similar purpose in this field before this application but gets well known for a similar purpose in this field after this application.

In the context of the present description, any items/substances/matters not mentioned are directly applicable to those known in the art without any change other than those explicitly stated. Moreover, any of the embodiments described herein can be freely combined with one or more other embodiments described herein, and thus the resulting technical solution or technical idea is considered to be part of the original disclosure or original description of the present invention, and it should not be considered as new content that has not been disclosed or contemplated herein, unless it is apparent to those skilled in the art that the combination is clearly unreasonable.

In the context of the present description, the term "halogen" refers to fluoro, chloro, bromo or iodo.

In the context of the present description, the term "hydrocarbyl" has the conventional known meanings in the art, including linear or branched alkyl, linear or branched alkenyl, linear or branched alkynyl, cycloalkyl, cycloalkenyl, aryl or a combination thereof. As said hydrocarbyl, it is preferably linear or branched alkyl, linear or branched alkenyl, aryl or a combination thereof. As said hydrocarbyl, specifically for example $C_{1-30}$hydrocarbyl may be exemplified, more specifically for example $C_{1-30}$linear or branched alkyl, $C_{2-30}$linear or branched alkenyl, $C_{3-20}$cycloalkyl, $C_{3-20}$cycloalkenyl, $C_{6-20}$aryl or a combination thereof may be exemplified.

In the context of the present description, the term "$C_{3-20}$cycloalkyl" refers to monocyclic, biscyclic or polycyclic cycloalkyl having 3-20 carbon atoms on the ring. As said $C_{3-20}$cycloalkyl, for example monocyclic cycloalkyl such as cyclopropyl, cyclohexyl and cyclopentyl, and spiro-ring, bridged-ring or fused-ring type biscyclic or polycyclic cycloalkyl such as octahydropentalenyl, decalinyl, adamantanyl, spiro[2.4]heptyl, spiro[4.5]decyl, biscyclo[3.2.1]octyl, tricyclo[2.2.1.0²,⁶]octyl, norbornanyl,

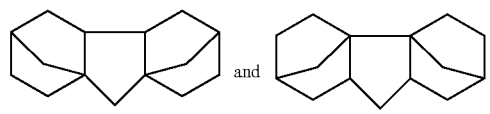

may be exemplified. As said $C_{3-20}$cycloalkyl, $C_{3-15}$cycloalkyl is more preferable.

In the context of the present description, the term "$C_{3-20}$cycloalkenyl" refers to a group formed by replacing a carbon-carbon single bond (C—C) on the at least one ring of the fore said $C_{3-20}$cycloalkyl with a carbon-carbon double band (C=C). As said $C_{3-20}$cycloalkenyl, for example, monocyclic cycloalkenyl such as cyclobutenyl, cyclopentenyl, cyclopentadienyl, cyclohexenyl, cyclohexadienyl, cycloheptenyl, cycloheptadienyl, cyclooctatetraenyl and the like, and spiro-ring, bridge-ring or fused-ring type biscyclic or polycyclic cycloalkenyl such as dicyclopentadienyl, norbornenyl, norbornadienyl,

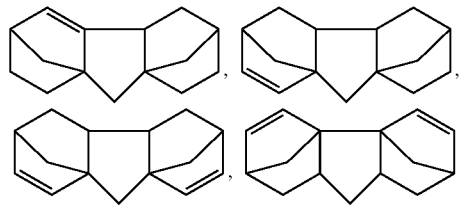

and the like may be exemplified. As said $C_{3-20}$cycloalkenyl, $C_{3-15}$cycloalkenyl is more preferable.

In the context of the present description, the term "$C_{6-20}$aryl" refers to an aromatic hydrocarbyl having 6-20 carbon atoms on the ring. As said $C_{6-20}$aryl, for example phenyl, a group formed by directly attaching two or more benzene rings through single bond(s) such as biphenyl and triphenyl, and a group formed by fusing two or more benzene rings such as naphthyl, anthryl and phenanthryl may be exemplified. As said $C_{6-20}$aryl, phenyl and biphenyl are more preferable.

In the context of the present description, as $C_{1-4}$linear or branched alkyl, for example methyl, ethyl or propyl and the like may be exemplified, and as $C_{2-4}$linear or branched alkenyl, for example ethenyl, allyl or propenyl and the like may be exemplified.

In the context of the present description, the term "linear or branched heteroalkyl" refers to a group obtained by inserting the carbon-chain structure of the linear or branched alkyl with one or more (for example 1-5, 1-4, 1-3, 1-2 or 1) hetero groups selected from —O—, —S— and —NR— (wherein the group R is selected from H and $C_{1-4}$linear or branched alkyl, preferably selected from H and methyl). From the viewpoint of the structure stability, it is preferable that if existing, any two of said hetero groups are not directly attached. It is obvious that said hetero group is not at the end of the carbon chain of said linear or branched alkyl or said linear or branched heteroalkyl. It should be particularly noted that, although said inserting in some cases (for example, it is a inserting with a hetero group —NR— and R represents a $C_{1-4}$linear or branched alkyl) may result in that said inserted linear or branched heteroalkyl and said linear or branched alkyl have different total carbon atom numbers, however for the expression convenience, the carbon atom number of said linear or branched alkyl before said inserting is still used to refer to the carbon atom number of said inserted linear or branched heteroalkyl after said inserting. Specifically speaking, inserting $C_4$linear alkyl ($CH_3$—$CH_2$—$CH_2$—$CH_2$—) with one hetero group —O— can produce the $C_4$linear heteroalkyl such as $CH_3$—O—$CH_2$—$CH_2$—$CH_2$—, $CH_3$—$CH_2$—O—$CH_2$—$CH_2$— or $CH_3$—$CH_2$—$CH_2$—O—$CH_2$—; inserting the $C_4$linear alkyl with two hetero groups-O— can produce the $C_4$linear heteroalkyl such as $CH_3$—O—$CH_2$—O—$CH_2$—$CH_2$—, $CH_3$—$CH_2$—O—$CH_2$—O—$CH_2$— or $CH_3$—$CH_2$—O—$CH_2$—$CH_2$—O—$CH_2$—; and inserting the $C_4$linear alkyl with three hetero groups —O— can produce the $C_4$linear heteroalkyl such as $CH_3$—O—$CH_2$—O—$CH_2$—O—$CH_2$—. Alternatively, inserting the $C_4$linear alkyl ($CH_3$—$CH_2$—$CH_2$—$CH_2$—) with one hetero group —$NCH_3$— can produce the $C_4$linear heteroalkyl such as $CH_3$—$NCH_3$—$CH_2$—$CH_2$—$CH_2$—, $CH_3$—$CH_2$—$NCH_3$—$CH_2$—$CH_2$— or $CH_3$—$CH_2$—$CH_2$—$NCH_3$—$CH_2$—; inserting the $C_4$linear alkyl ($CH_3$—$CH_2$—$CH_2$—$CH_2$—) with two hetero groups —$NCH_3$— can produce the $C_4$linear heteroalkyl such as $CH_3$—$NCH_3$—$CH_2$—$NCH_3$—$CH_2$—$CH_2$—, $CH_3$—$CH_2$—$NCH_3$—$CH_2$—$NCH_3$—$CH_2$— or $CH_3$—$NCH_3$—$CH_2$—$CH_2$—$NCH_3$—$CH_2$—; and inserting the $C_4$linear alkyl ($CH_3$—$CH_2$—$CH_2$—$CH_2$—) with three hetero groups —$NCH_3$— can produce the $C_4$linear heteroalkyl such as $CH_3$—$NCH_3$—$CH_2$—$NCH_3$—$CH_2$—$NCH_3$—$CH_2$—.

In the context of this description, unless otherwise specified, the number-average molecular weight (Mn) is determined by gel permeation chromatography (GPC).

In the context of the present description, unless otherwise specified, the gel permeation chromatography is performed on Waters 2695 Gel Permeation Chromatograph (from Waters, USA), with a mobile phase of tetrafuran, a flow rate of 1 mL/min, a column temperature of 35 degrees Celsius, an elution time of 40 min, and a weight fraction of the sample of from 0.16% to 0.20%.

Finally, in case of being not particularly specified, all of percents, parts or ratios or the like mentioned in this description are on a weight basis, except that being based on the weight does not comply with the conventional knowledge of those skilled in the art.

According to the present invention, a benzotriazole derivative is firstly discussed, wherein it structure is shown with the following general formula (I).

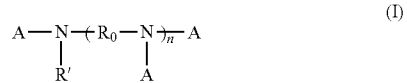

(I)

According to the present invention, in the general formula (I), the group R' is selected from $C_{1-25}$hydrocarbyl, $C_{3-25}$linear or branched heteroalkyl and a hydrocarbyl having a number-average molecular weight Mn of 300-3000.

According to a special embodiment of the present invention, in the general formula (I), the group R' is selected from $C_{1-20}$hydrocarbyl and $C_{3-20}$linear or branched heteroalkyl.

According to a special embodiment of the present invention, in the general formula (I), the group R' is selected from $C_{10-25}$linear or branched alkyl, $C_{10-25}$linear or branched alkenyl, $C_{10-25}$linear or branched alkynyl, $C_{10-25}$linear or branched heteroalkyl and polyisobutenyl having a number-average molecular weight Mn of 300-3000.

According to an embodiment of the present invention, in the general formula (I), the group R' represents $C_{10-25}$linear or branched alkyl. Herein, as said $C_{10-25}$linear or branched alkyl, for example $C_{10-25}$linear alkyl may be exemplified, or for example n-dodecyl, n-tridecyl, n-tetradecyl, n-pentadecyl, n-hexadecyl, n-heptadecyl, n-octadecyl, n-eicosyl, n-heneicosyl, n-tetracosyl, neo-dodecyl, neo-tridecyl, neo-tetradecyl, neo-pentadecyl, neo-hexadecyl, neo-heptadecyl, neo-octadecyl, neo-eicosyl, neo-heneicosyl, neo-tetracosyl and the like may be exemplified.

According to an embodiment of the present invention, in the general formula (I), the group R' represents $C_{10-25}$linear or branched alkenyl. Herein, as said $C_{10-25}$linear or branched alkenyl, for example $C_{10-25}$linear alkenyl may be exemplified, or for example n-6-dodecenyl, n-6-tridecenyl, n-7-tetradecenyl, n-7-pentadecenyl, n-8-hexadecenyl, n-8-heptadecenyl, n-9-octadecenyl, n-9-eicosenyl, n-10-heneicosenyl, n-12-tetracosenyl, neo-6-dodecenyl, neo-6-tridecenyl, neo-7-tetradecenyl, neo-7-pentadecenyl, neo-8-hexadecenyl, neo-8-heptadecenyl, neo-9-octadecenyl, neo-9-eicosenyl, neo-10-heneicosenyl, neo-12-tetracosenyl and the like may be exemplified.

According to a special embodiment of the present invention, in the general formula (I), the group R' represents the hydrocarbyl having a number-average molecular weight Mn of 300-3000. Herein, as said the hydrocarbyl having a number-average molecular weight Mn of 300-3000, for example a hydrocarbyl obtained by removing one hydrogen atom from a polyolefin having a number-average molecular weight Mn of 300-3000 (in particular at the end of the polyolefin molecule chain) (referred to as polyolefin residue) may be exemplified. Herein, as the number-average molecular weight (Mn) of said polyolefin or said polyolefin residue, it is preferably 500-2000, more preferably 500-1500. As said polyolefin, for example the polyolefin obtained by homopolymerizingethene, propene or $C_4$-$C_{10}$ α-olefin (such as n-butene, iso-butene, n-pentene, n-hexene, n-octene or n-decene) or by copolymerizing two or more of these olefins may be exemplified, and among others polyisobutylene (PIB) is more preferable.

According to the present invention, in the general formula (I), n is selected from an integer of 0-10.

According to a special embodiment of the present invention, in the general formula (I), n is an integer selected from 0-5.

According to a special embodiment of the present invention, in the general formula (I), n is 0, 1, 2 or 3, specifically for example 0 may be exemplified.

According to the present invention, in the general formula (I), n groups $R_0$ are identical to or different from each other and each independently selected from $C_{1-10}$linear or branched alkylene.

According to a special embodiment of the present invention, in the general formula (I), n groups $R_0$ are identical to or different from each other and each independently selected from $C_{2-5}$linear or branched alkylene. Herein, as said $C_{2-5}$linear or branched alkylene, specifically for example ethylene or propylene may be exemplified.

According to the present invention, in the general formula (I), n+2 groups A are identical to or different from each other and each independently selected from hydrogen, the group represented by formula (I-1), the group represented by formula (I-2), $C_{1-25}$hydrocarbyl and the hydrocarbyl having a number-average molecular weight Mn of 300-3000.

According to a special embodiment of the present invention, in the general formula (I), n+2 groups A are identical to or different from each other and each independently selected from hydrogen, the group represented by formula (I-1), the group represented by formula (I-2), $C_{1-6}$linear or branched alkyl, $C_{10-25}$linear or branched alkyl, $C_{10-25}$linear or branched alkenyl and polyisobutenyl having a number-average molecular weight Mn of 300-3000.

According to a special embodiment of the present invention, in the general formula (I), n+2 groups A are identical to or different from each other and each independently selected from hydrogen, the group represented by formula (I-1), the group represented by formula (I-2) and $C_{1-4}$linear or branched alkyl.

According to a special embodiment of the present invention, in the general formula (I), n+2 groups A are identical to or different from each other and each independently selected from hydrogen, the group represented by formula (I-1) and the group represented by formula (I-2).

According to an embodiment of the present invention, in the general formula (I), the group A represents hydrogen.

According to an embodiment of the present invention, in the general formula (I), the group A represents $C_{1-4}$linear or branched alkyl.

According to an embodiment of the present invention, in the general formula (I), the group A represents $C_{10-25}$linear or branched alkyl. Herein, as said $C_{10-25}$linear or branched alkyl, for example $C_{10-25}$linear alkyl may be exemplified, or for example n-dodecyl, n-tridecyl, n-tetradecyl, n-pentadecyl, n-hexadecyl, n-heptadecyl, n-octadecyl, n-eicosyl, n-heneicosyl, n-tetracosyl, neo-dodecyl, neo-tridecyl, neo-tetradecyl, neo-pentadecyl, neo-hexadecyl, neo-heptadecyl, neo-octadecyl, neo-eicosyl, neo-heneicosyl, neo-tetracosyl and the like may be exemplified.

According to an embodiment of the present invention, in the general formula (I), the group A represents $C_{10-25}$linear or branched alkenyl. Herein, as said $C_{10-25}$linear or branched alkenyl, for example $C_{10-25}$linear alkenyl may be exemplified, or for example n-6-dodecenyl, n-6-tridecenyl, n-7-tetradecenyl, n-7-pentadecenyl, n-8-hexadecenyl, n-8-heptadecenyl, n-9-octadecenyl, n-9-eicosenyl, n-10-heneicosenyl, n-12-tetracosenyl, neo-6-dodecenyl, neo-6-tridecenyl, neo-7-tetradecenyl, neo-7-pentadecenyl, neo-8-hexadecenyl, neo-8-heptadecenyl, neo-9-octadecenyl, neo-9-eicosenyl, neo-10-heneicosenyl, neo-12-tetracosenyl and the like may be exemplified.

According to a special embodiment of the present invention, in the general formula (I), the group A represents a hydrocarbyl having a number-average molecular weight (Mn) of 300-3000. Herein, as said hydrocarbyl having a number-average molecular weight (Mn) of 300-3000, for example a hydrocarbyl obtained by removing one hydrogen atom from a polyolefin having a number-average molecular weight Mn of 300-3000 (in particular at the end of the polyolefin molecule chain) (referred to as polyolefin residue) may be exemplified.

Herein, as the number-average molecular weight (Mn) of said polyolefin or said polyolefin residue, it is preferably 500-2000, more preferably 500-1500. As said polyolefin, for example the polyolefin obtained by homopolymerizingethene, propene or $C_4$-$C_{10}$ α-olefin (such as n-butene, iso-butene, n-pentene, n-hexene, n-octene or n-decene) or by copolymerizing two or more of these olefins may be exemplified, and among others polyisobutylene (PIB) is more preferable.

According to the present invention, in the general formula (I), at least one of said n+2 groups A is the group represented by formula (I-1), and at least one of said n+2 groups A is the group represented by formula (I-2). Specially for example, when n is 0, in the general formula (I), one of two said groups A is the group represented by formula (I-1), the other is the group represented by formula (I-2). Alternatively, specially for example, when n is 1, in the general formula (I), one of three said groups A is the group represented by formula (I-1), the other two are the group represented by formula (I-2), or two of three said groups A are the group represented by formula (I-1), the other is the group represented by formula (I-2). Alternatively, specially for example, when n is 1, in the general formula (I), one of three said groups A is the group represented by formula (I-1), one is the group represented by formula (I-2), one is hydrogen, $C_{1-4}$linear or branched alkyl, $C_{10-25}$linear or branched alkyl, $C_{10-25}$linear or branched alkenyl or the hydrocarbyl having a number-average molecular weight Mn of 300-3000.

According to a special embodiment of the present invention, in the general formula (I), when at least one of said n+2 groups A represents said $C_{10-25}$linear or branched alkyl, said $C_{10-25}$linear or branched alkenyl or said hydrocarbyl having a number-average molecular weight Mn of 300-3000, said group R' can also be hydrogen or is hydrogen. In other words, according to the special embodiment of the present invention, in the general formula (I), at least one of the group A and the group R' must represent said $C_{10-25}$linear or branched alkyl, said $C_{10-25}$linear or branched alkenyl or said hydrocarbyl having a number-average molecular weight Mn of 300-3000.

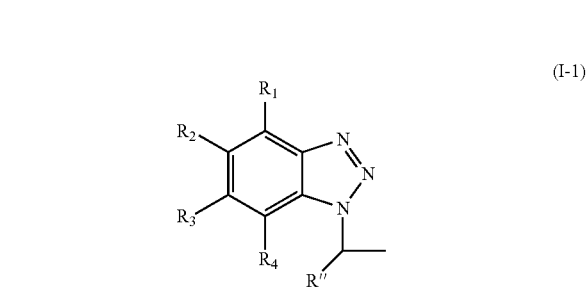

(I-1)

According to the present invention, in the general formula (I-1), the groups $R_1$, $R_2$, $R_3$ and $R_4$ are identical to or different from each other and each independently selected from hydrogen and $C_{1-20}$hydrocarbyl.

According to a special embodiment of the present invention, in the general formula (I-1), the groups $R_1$, $R_2$, $R_3$ and $R_4$ are identical to or different from each other and each independently selected from hydrogen and $C_{1-10}$linear or branched alkyl. Herein, as said $C_{1-10}$linear or branched alkyl, specifically for example $C_{1-6}$linear or branched alkyl may be exemplified, more specifically for example $C_{1-6}$linear alkyl may be exemplified, more specifically for example methyl, n-butyl, iso-butyl, n-hexyl and the like may be exemplified.

According to a special embodiment of the present invention, in the general formula (I-1), $R_1$ and $R_4$ are hydrogen, one of $R_2$ and $R_3$ is $C_{1-10}$linear or branched alkyl, and the other is hydrogen. Herein, as said $C_{1-10}$linear or branched alkyl, specifically for example $C_{1-6}$linear or branched alkyl may be exemplified, more specifically for example $C_{1-6}$linear alkyl may be exemplified, more specifically for example methyl, n-butyl, iso-butyl, n-hexyl and the like may be exemplified.

According to a special embodiment of the present invention, in the general formula (I-1), $R_1$, $R_3$ and $R_4$ are hydrogen, and $R_2$ is $C_{1-10}$linear or branched alkyl. Herein, as said $C_{1-10}$linear or branched alkyl, specifically for example $C_{1-6}$linear or branched alkyl may be exemplified, more specifically for example $C_{1-6}$linear alkyl may be exemplified, more specifically for example methyl, n-butyl, iso-butyl, n-hexyl and the like may be exemplified.

According to the present invention, in the general formula (I-1), the group R″ is selected from hydrogen and $C_{1-20}$hydrocarbyl.

According to a special embodiment of the present invention, in the general formula (I-1), the group R″ is selected from hydrogen and $C_{1-20}$linear or branched alkyl.

According to a special embodiment of the present invention, in the general formula (I-1), the group R″ is selected from hydrogen and $C_{1-6}$linear or branched alkyl. Herein, as said $C_{1-6}$linear or branched alkyl, specifically for example $C_{1-6}$linear alkyl may be exemplified, more specifically for example methyl, ethyl, n-propyl and the like may be exemplified.

According to a special embodiment of the present invention, in the general formula (I-1), the group R″ represents hydrogen.

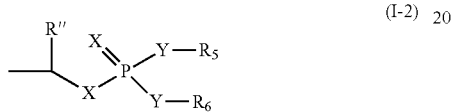
(I-2)

According to the present invention, in the general formula (I-2), the groups $R_5$ and $R_6$ are identical to or different from each other and each independently selected from $C_{1-20}$hydrocarbyl.

According to a special embodiment of the present invention, in the general formula (I-2), the groups $R_5$ and $R_6$ are identical to or different from each other and each independently selected from $C_{1-20}$linear or branched alkyl.

According to a special embodiment of the present invention, in the general formula (I-2), the groups $R_5$ and $R_6$ are identical to or different from each other and each independently selected from $C_{1-15}$linear or branched alkyl.

According to a special embodiment of the present invention, in the general formula (I-2), the groups $R_5$ and $R_6$ are identical to or different from each other and each independently selected from $C_{3-12}$linear or branched alkyl. Herein, as said $C_{3-12}$linear or branched alkyl, specifically for example n-propyl, n-butyl, n-hexyl, n-decyl, n-dodecyl, iso-butyl, iso-pentyl, iso-octyl, iso-decyl, iso-dodecyl, 2-ethyl-n-hexyl, 2-ethyl-n-heptyl, 2-ethyl-n-octyl, 2-ethyl-n-decyl and the like may be exemplified.

According to the present invention, in the general formula (I-2), the groups X and Y are identical to or different from each other and each independently selected from oxygen atom and sulfur atom.

According to a special embodiment of the present invention, in the general formula (I-2), two groups X are both sulfur atoms, two groups Y are both oxygen atom.

According to the present invention, in the general formula (I-2), the group R″ is selected from hydrogen and $C_{1-20}$hydrocarbyl.

According to a special embodiment of the present invention, in the general formula (I-2), the group R″ is selected from hydrogen and $C_{1-20}$linear or branched alkyl.

According to a special embodiment of the present invention, in the general formula (I-2), the group R″ is selected from hydrogen and $C_{1-6}$linear or branched alkyl. Herein, as said $C_{1-6}$linear or branched alkyl, specifically for example $C_{1-6}$linear alkyl may be exemplified, more specifically for example methyl, ethyl, n-propyl and the like may be exemplified.

According to a special embodiment of the present invention, in the general formula (I-2), the group R″ represents hydrogen.

According to a special embodiment of the present invention, said benzotriazole derivative is selected from the following specific compounds or a mixture of two or more of the following specific compounds:

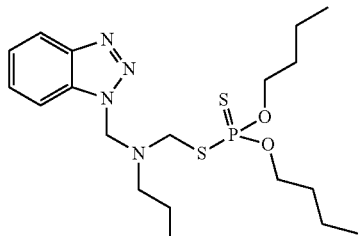

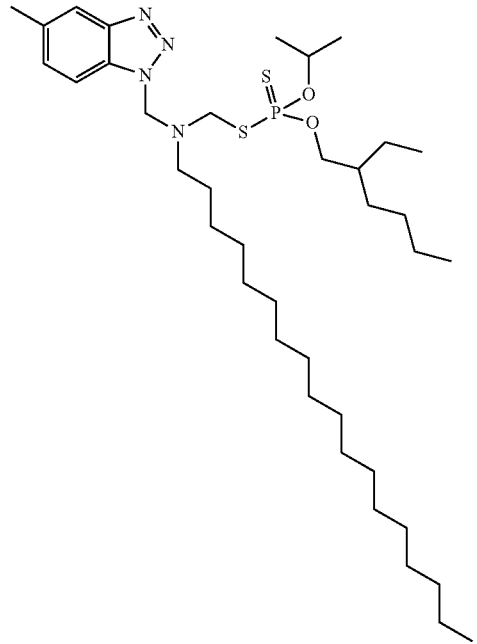 [SMILES: CCCCCCCCCCCCCCCCCCN(CSP(=S)(OCC(CC)CCCC)OC(C)C)Cn1nnc2cc(C)ccc21]

19
-continued
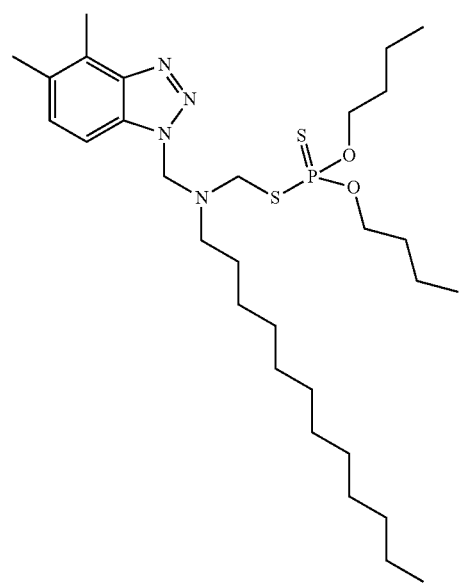
20
-continued
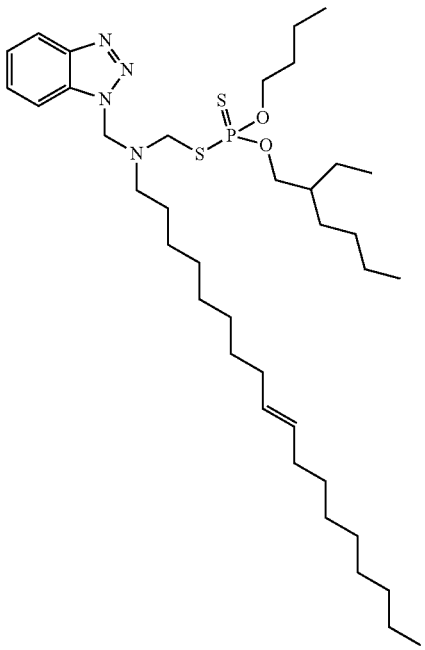 [SMILES: CCCCCCCC/C=C/CCCCCCCCN(CSP(=S)(OCCCC)OCC(CC)CCCC)Cn1nnc2ccccc21]
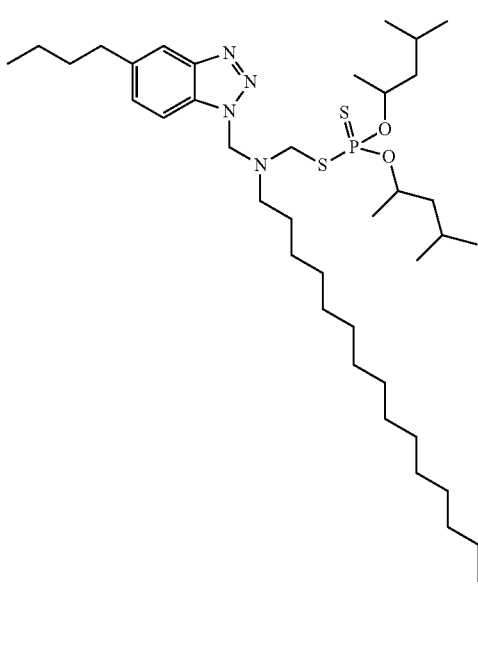
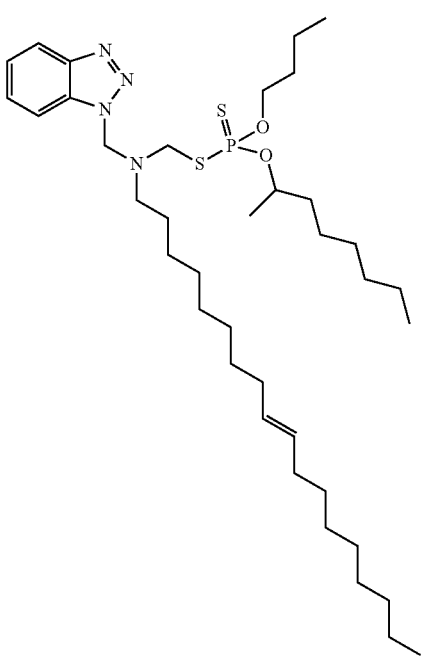

21
-continued
22
-continued
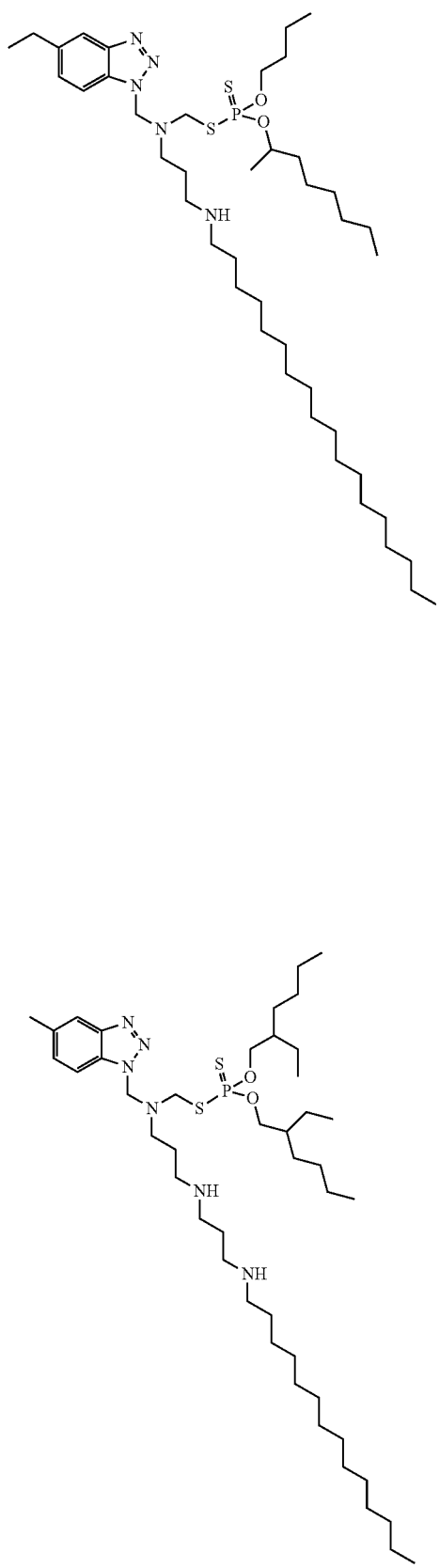
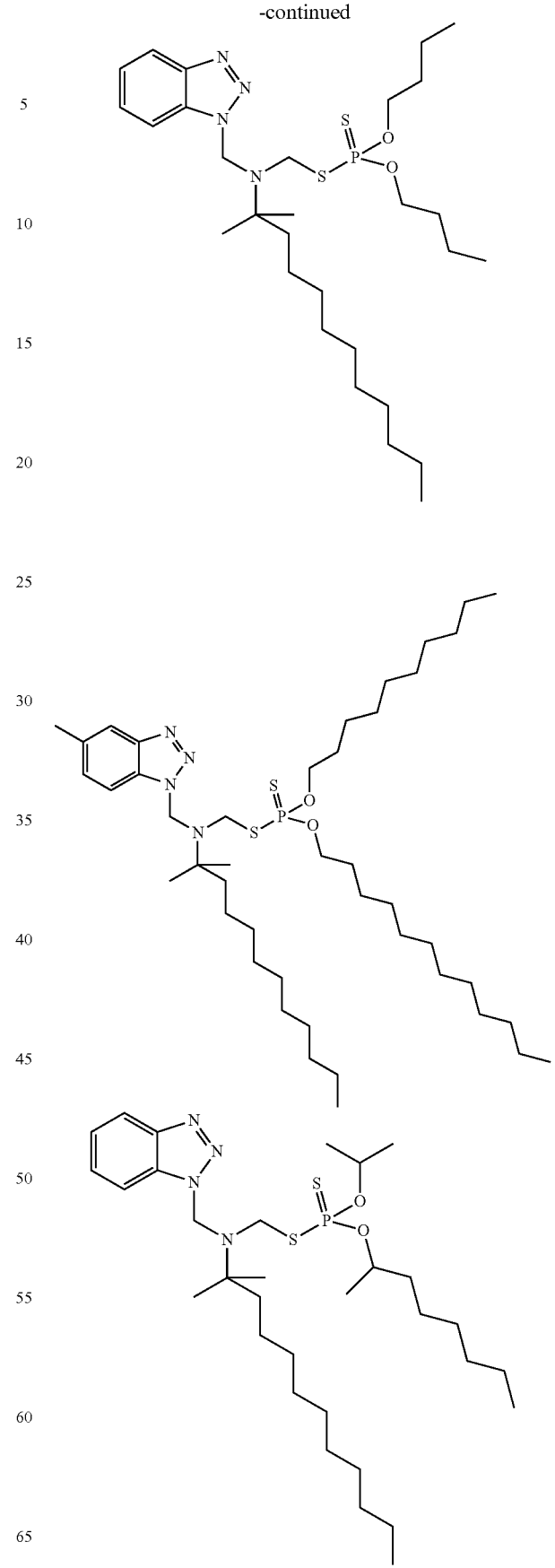

-continued

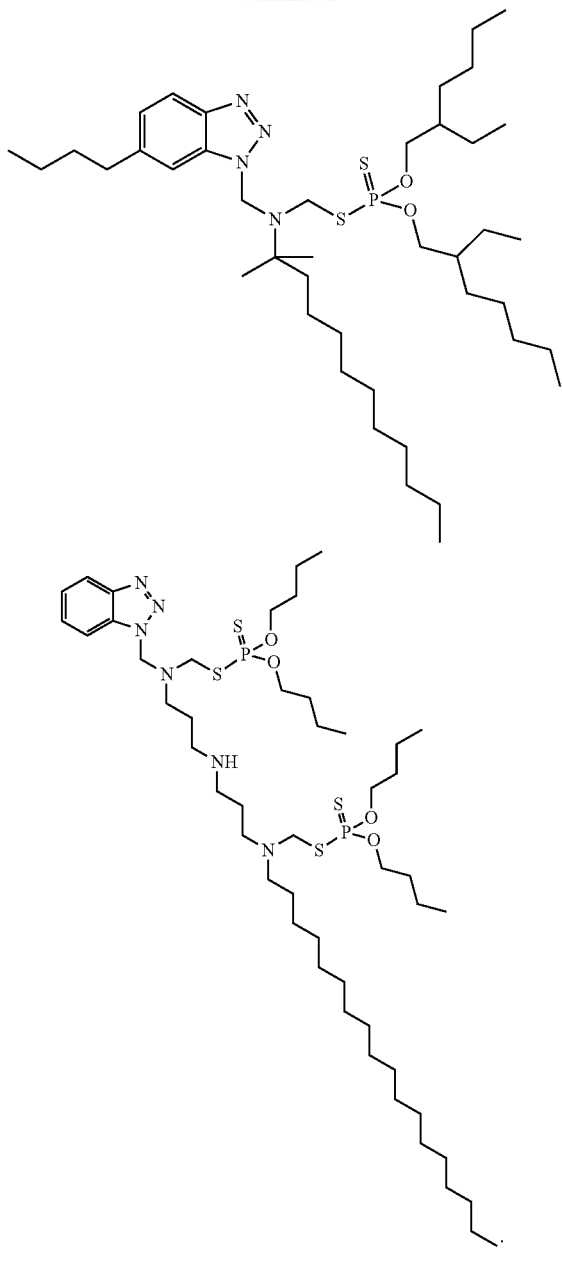

According to the present invention, said benzotriazole derivative(s) can be present, prepared or used in form of a single (pure) compound, or in form of a mixture of two or more compounds (in any ratio), which does not affect the achievement of the effect of the present invention.

According to the present invention, for example, said benzotriazole derivative can be prepared with the following preparation process.

According to the present invention, said preparation process comprises the step of reacting the phosphorus compound represented by formula (I-A), the amine compound represented by formula (I-B) and the benzotriazole compound represented by formula (I-C) in presence of the aldehyde represented by formula (I-D). Hereinafter, this step is abbreviated as reaction step.

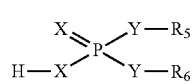
(I-A)

According to the present invention, in the general formula (I-A), the groups $R_5$ and $R_6$ are identical to or different from each other and each independently selected from $C_{1-20}$hydrocarbyl.

According to a special embodiment of the present invention, in the general formula (I-A), the groups $R_5$ and $R_6$ are identical to or different from each other and each independently selected from $C_{1-20}$linear or branched alkyl.

According to a special embodiment of the present invention, in the general formula (I-A), the groups $R_5$ and $R_6$ are identical to or different from each other and each independently selected from $C_{1-15}$linear or branched alkyl.

According to a special embodiment of the present invention, in the general formula (I-A), the groups $R_5$ and $R_6$ are identical to or different from each other and each independently selected from $C_{3-12}$linear or branched alkyl. Herein, as said $C_{3-12}$linear or branched alkyl, specifically for example n-propyl, n-butyl, n-hexyl, n-decyl, n-dodecyl, iso-butyl, iso-pentyl, iso-octyl, iso-decyl, iso-dodecyl, 2-ethyl-n-hexyl, 2-ethyl-n-heptyl, 2-ethyl-n-octyl and 2-ethyl-n-decyl or the like may be exemplified.

According to the present invention, in the general formula (I-A), the groups X and Y are identical to or different from each other and each independently selected from oxygen atom and sulfur atom.

According to a special embodiment of the present invention, in the general formula (I-A), two groups X are both sulfur atoms, two groups Y are both oxygen atom.

According to the present invention, said phosphorus compound represented by formula (I-A) can be a commercially available product, or can be produced with a conventional method known in the art without the particular limitation. In addition, said phosphorus compound represented by formula (I-A) can be used in form of a single compound or in form of a combination of two or more compounds.

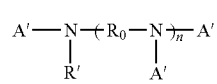
(I-B)

According to the present invention, in the general formula (I-B), the group R' is selected from $C_{1-25}$hydrocarbyl, $C_{3-25}$linear or branched heteroalkyl and the hydrocarbyl having a number-average molecular weight Mn of 300-3000.

According to a special embodiment of the present invention, in the general formula (I-B), the group R' is selected from $C_{1-20}$hydrocarbyl and $C_{3-20}$linear or branched heteroalkyl.

According to a special embodiment of the present invention, in the general formula (I-B), the group R' is selected from $C_{10-25}$linear or branched alkyl, $C_{10-25}$linear or branched alkenyl, $C_{10-25}$linear or branched alkynyl, $C_{10-25}$linear or branched heteroalkyl and polyisobutenyl having a number-average molecular weight Mn of 300-3000.

According to an embodiment of the present invention, in the general formula (I-B), the group R' represents $C_{10-25}$linear or branched alkyl. Herein, as said $C_{10-25}$linear or branched alkyl, for example $C_{10-25}$linear alkyl may be exemplified, or for example n-dodecyl, n-tridecyl, n-tetradecyl, n-pentadecyl, n-hexadecyl, n-heptadecyl, n-octadecyl, n-eicosyl, n-heneicosyl, n-tetracosyl, neo-dodecyl, neo-tridecyl, neo-tetradecyl, neo-pentadecyl, neo-hexadecyl, neo-heptadecyl, neo-octadecyl, neo-eicosyl, neo-heneicosyl, neo-tetracosyl and the like may be exemplified.

According to an embodiment of the present invention, in the general formula (I-B), the group R' represents $C_{10-25}$ linear or branched alkenyl. Herein, as said $C_{10-25}$ linear or branched alkenyl, for example $C_{10-25}$ linear alkenyl may be exemplified, or for example n-6-dodecenyl, n-6-tridecenyl, n-7-tetradecenyl, n-7-pentadecenyl, n-8-hexadecenyl, n-8-heptadecenyl, n-9-octadecenyl, n-9-eicosenyl, n-10-heneicosenyl, n-12-tetracosenyl, neo-6-dodecenyl, neo-6-tridecenyl, neo-7-tetradecenyl, neo-7-pentadecenyl, neo-8-hexadecenyl, neo-8-heptadecenyl, neo-9-octadecenyl, neo-9-eicosenyl, neo-10-heneicosenyl, neo-12-tetracosenyl and the like may be exemplified.

According to a special embodiment of the present invention, in the general formula (I-B), the group R' represents the hydrocarbyl having a number-average molecular weight Mn of 300-3000. Herein, as said the hydrocarbyl having a number-average molecular weight Mn of 300-3000, for example a hydrocarbyl obtained by removing one hydrogen atom from a polyolefin having a number-average molecular weight Mn of 300-3000 (in particular at the end of the polyolefin molecule chain) (referred to as polyolefin residue) may be exemplified. Herein, as the number-average molecular weight Mn of said polyolefin said polyolefin residue, it is preferably 500-2000, more preferably 500-1500.

In the context of the present description, depending on the type or the preparation process of the starting polyolefin, said polyolefin residue can be saturated (as a long-chain alkyl), or a certain amount of olefinic double bonds can be present in the polymer chain (for example, left over in the preparation of the polyolefin), which does not affect the achievement of the effect of the present invention. The present invention has no intention to limit the above amount.

According to a special embodiment of the present invention, as said polyolefin, for example the polyolefin obtained by homopolymerizing ethene, propene or $C_4$-$C_{10}$ α-olefin (for example n-butene, iso-butene, n-pentene, n-hexene, n-octene or n-decene) or copolymerizing two or more of these olefins may be exemplified.

According to a special embodiment of the present invention, as said polyolefin, it is more preferably polybutylene. Unless otherwise indicated, the term "polybutylene" used herein generally comprises a polymer obtained by homopolymerizing 1-butene or iso-butene, and a polymer obtained by copolymerizing two or three of 1-butene, 2-butene and iso-butene. This kind of commercially available polymer products can contain a negligible amount of other olefin components, which does not affect the implementation of the present invention.

According to a special embodiment of the present invention, as said polyolefin, it is further preferably polyisobutylene (PIB) or a high reactive polyisobutylene (HR-PIB). In this kind of polyisobutylene, at least 20 wt % (preferably at least 50 wt %, more preferably at least 70 wt %) of the total terminal olefinic double bonds is provided by methylvinylidene.

According to the present invention, in the general formula (I-B), n is selected from an integer of 0-10.

According to a special embodiment of the present invention, in the general formula (I-B), n is an integer selected from 0-5.

According to a special embodiment of the present invention, in the general formula (I-B), n is 0, 1, 2 or 3, specifically for example 0 may be exemplified.

According to the present invention, in the general formula (I-B), n groups $R_0$ are identical to or different from each other and each independently selected from $C_{1-10}$ linear or branched alkylene.

According to a special embodiment of the present invention, in the general formula (I-B), n groups $R_0$ are identical to or different from each other and each independently selected from $C_{2-5}$ linear or branched alkylene. Herein, as said $C_{2-5}$ linear or branched alkylene, specifically for example ethylene or propylene may be exemplified.

According to the present invention, in the general formula (I-B), n+2 groups A' are identical to or different from each other and each independently selected from hydrogen, $C_{1-25}$ hydrocarbyl and the hydrocarbyl having a number-average molecular weight Mn of 300-3000.

According to a special embodiment of the present invention, in the general formula (I-B), n+2 groups A' are identical to or different from each other and each independently selected from hydrogen, $C_{1-6}$ linear or branched alkyl, $C_{10-25}$ linear or branched alkyl, $C_{10-25}$ linear or branched alkenyl and polyisobutenyl having a number-average molecular weight Mn of 300-3000.

According to a special embodiment of the present invention, in the general formula (I-B), n+2 groups A' are identical to or different from each other and each independently selected from hydrogen and $C_{1-4}$ linear or branched alkyl.

According to an embodiment of the present invention, in the general formula (I-B), the group A' represents hydrogen.

According to an embodiment of the present invention, in the general formula (I-B), the group A' represents $C_{1-4}$ linear or branched alkyl.

According to an embodiment of the present invention, in the general formula (I-B), the group A' represents $C_{10-25}$ linear or branched alkyl. Herein, as said $C_{10-25}$ linear or branched alkyl, for example $C_{10-25}$ linear alkyl may be exemplified, or for example n-dodecyl, n-tridecyl, n-tetradecyl, n-pentadecyl, n-hexadecyl, n-heptadecyl, n-octadecyl, n-eicosyl, n-heneicosyl, n-tetracosyl, neo-dodecyl, neo-tridecyl, neo-tetradecyl, neo-pentadecyl, neo-hexadecyl, neo-heptadecyl, neo-octadecyl, neo-eicosyl, neo-heneicosyl, neo-tetracosyl and the like may be exemplified.

According to an embodiment of the present invention, in the general formula (I-B), the group A' represents $C_{10-25}$ linear or branched alkenyl. Herein, as said $C_{10-25}$ linear or branched alkenyl, for example $C_{10-25}$ linear alkenyl may be exemplified, or for example n-6-dodecenyl, n-6-tridecenyl, n-7-tetradecenyl, n-7-pentadecenyl, n-8-hexadecenyl, n-8-heptadecenyl, n-9-octadecenyl, n-9-eicosenyl, n-10-heneicosenyl, n-12-tetracosenyl, neo-6-dodecenyl, neo-6-tridecenyl, neo-7-tetradecenyl, neo-7-pentadecenyl, neo-8-hexadecenyl, neo-8-heptadecenyl, neo-9-octadecenyl, neo-9-eicosenyl, neo-10-heneicosenyl, neo-12-tetracosenyl and the like may be exemplified.

According to a special embodiment of the present invention, in the general formula (I-B), the group A' represents the hydrocarbyl having a number-average molecular weight Mn of 300-3000. Herein, as said the hydrocarbyl having a number-average molecular weight Mn of 300-3000, for example a hydrocarbyl group obtained by removing one hydrogen atom from a polyolefin having a number-average molecular weight Mn of 300-3000 (in particular from the end of the polyolefin molecule chain) (called as polyolefin residue) may be exemplified. Herein, as the number-average molecular weight Mn of said polyolefin or said polyolefin residue, 500-2000 is preferable, 500-1500 is more preferable.

In the context of the present description, depending on the type or the preparation process of the starting polyolefin, said polyolefin residue can be saturated (as a long-chain alkyl), or a certain amount of olefinic double bonds can be present in the polymer chain (for example, left over in the preparation of the polyolefin), which does not affect the achievement of the effect of the present invention. The present invention has no intention to limit the above amount.

According to a special embodiment of the present invention, as said polyolefin, for example the polyolefin obtained by homopolymerizing ethene, propene or $C_4$-$C_{10}$ α-olefin (for example n-butene, iso-butene, n-pentene, n-hexene, n-octene or n-decene) or copolymerizing two or more of these olefins may be exemplified.

According to a special embodiment of the present invention, as said polyolefin, it is more preferably polybutylene. Unless otherwise indicated, the term "polybutylene" used herein generally comprises a polymer obtained by homopolymerizing 1-butene or iso-butene, and a polymer obtained by copolymerizing two or three of 1-butene, 2-butene and iso-butene. This kind of commercially available polymer products can contain a negligible amount of other olefin components, which does not affect the implementation of the present invention.

According to a special embodiment of the present invention, as said polyolefin, it is further preferably polyisobutylene (PIB) or a high reactive polyisobutylene (HR-PIB). In this kind of polyisobutylene, at least 20 wt % (preferably at least 50 wt %, more preferably at least 70 wt %) of the total terminal olefinic double bonds is provided by methylvinylidene.

According to the present invention, in the general formula (I-B), at least two of said n+2 groups A' represent hydrogen. Specially for example, when n is 0, in the general formula (I-B), two said groups A' both represent hydrogen. Alternatively, specially for example, when n is 1, in the general formula (I-B), two of three said groups A' represent hydrogen, and the other represents hydrogen, $C_{1-4}$linear or branched alkyl, $C_{10-25}$linear or branched alkyl, $C_{10-25}$linear or branched alkenyl or the hydrocarbyl having a number-average molecular weight Mn of 300-3000.

According to a special embodiment of the present invention, in the general formula (I-B), when at least one of said n+2 groups A' represents said $C_{10-25}$linear or branched alkyl, said $C_{10-25}$linear or branched alkenyl or said hydrocarbyl having a number-average molecular weight Mn of 300-3000, said group R' can also be hydrogen or is hydrogen. In other words, according to the special embodiment of the present invention, in the general formula (I-B), at least one of the group A' and the group R' must represent said $C_{10-25}$linear or branched alkyl, said $C_{10-25}$linear or branched alkenyl or said hydrocarbyl having a number-average molecular weight Mn of 300-3000.

According to the present invention, said amine compound represented by formula (I-B) can be a commercially available product, or can be produced with a conventional method known in the art without the particular limitation. In addition, said amine compound represented by formula (I-B) can be used in form of a single compound or in form of a combination of two or more compounds.

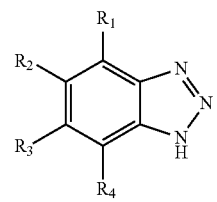

According to the present invention, in the general formula (I-C), the groups $R_1$, $R_2$, $R_3$ and $R_4$ are identical to or different from each other and each independently selected from hydrogen and $C_{1-20}$hydrocarbyl.

According to a special embodiment of the present invention, in the general formula (I-C), the groups $R_1$, $R_2$, $R_3$ and $R_4$ are identical to or different from each other and each independently selected from hydrogen and $C_{1-10}$linear or branched alkyl. Herein, as said $C_{1-10}$linear or branched alkyl, specifically for example $C_{1-6}$linear or branched alkyl may be exemplified, more specifically for example $C_{1-6}$linear alkyl may be exemplified, more specifically for example methyl, n-butyl, iso-butyl, n-hexyl and the like may be exemplified.

According to a special embodiment of the present invention, in the general formula (I-C), $R_1$ and $R_4$ are hydrogen, one of $R_2$ and $R_3$ is $C_{1-10}$linear or branched alkyl, and the other is hydrogen. Herein, as said $C_{1-10}$linear or branched alkyl, specifically for example $C_{1-6}$linear or branched alkyl may be exemplified, more specifically for example $C_{1-6}$linear alkyl may be exemplified, more specifically for example methyl, n-butyl, iso-butyl, n-hexyl and the like may be exemplified.

According to a special embodiment of the present invention, in the general formula (I-C), $R_1$, $R_3$ and $R_4$ are hydrogen, and $R_2$ is $C_{1-10}$linear or branched alkyl. Herein, as said $C_{1-10}$linear or branched alkyl, specifically for example $C_{1-6}$linear or branched alkyl may be exemplified, more specifically for example $C_{1-6}$linear alkyl may be exemplified, more specifically for example methyl, n-butyl, iso-butyl, n-hexyl and the like may be exemplified.

According to the present invention, said benzotriazole compound represented by formula (I-C) can be a commercially available product, or can be produced with a conventional method known in the art without the particular limitation. In addition, said benzotriazole compound represented by formula (I-C) can be used in form of a single compound or in form of a combination of two or more compounds.

According to the present invention, in the general formula (I-D), the group R" is selected from hydrogen and $C_{1-20}$hydrocarbyl.

According to a special embodiment of the present invention, in the general formula (I-D), the group R" is selected from hydrogen and $C_{1-20}$linear or branched alkyl.

According to a special embodiment of the present invention, in the general formula (I-D), the group R" is selected from hydrogen and $C_{1-6}$linear or branched alkyl. Herein, as said $C_{1-6}$linear or branched alkyl, specifically for example $C_{1-6}$linear alkyl may be exemplified, more specifically for example methyl, ethyl, n-propyl and the like may be exemplified.

According to a special embodiment of the present invention, in the general formula (I-D), the group R" represents hydrogen.

According to the present invention, said aldehyde represented by formula (I-D) can be a commercially available product, or can be produced with a conventional method known in the art without the particular limitation. In addition, said aldehyde represented by formula (I-D) can be used in form of a single compound or in form of a combination of two or more compounds.

According to a special embodiment of the present invention, said aldehyde represented by formula (I-D) is formaldehyde. As said formaldehyde, for example it can be used in form of formalin, paraform or paraformaldehyde without any particular limitation.

According to the present invention, in said reaction step, for example, the reaction time of said reaction is generally 0.1-24 h, preferably 0.2-12 h, most preferably 0.5-6 h, but it is not limited thereto in some cases.

According to the present invention, in said reaction step, for example, the reaction temperature of said reaction is generally 0-250° C., preferably 20-180° C., most preferably 60-120° C., but it is not limited thereto in some cases.

According to the present invention, in said reaction step, for example, the molar ratio of said phosphorus compound represented by formula (I-A) to said amine compound represented by formula (I-B) is generally 1:0.1-10, preferably 1:0.5-5.0, more preferably 1:0.6-1.5, but it is not limited thereto in some cases.

According to the present invention, in said reaction step, for example, the molar ratio of said phosphorus compound represented by formula (I-A) to said benzotriazole compound represented by formula (I-C) is generally 1:0.1-10, preferably 1:0.5-5.0, more preferably 1:0.6-1.5, but it is not limited thereto in some cases.

According to the present invention, in said reaction step, for example, the molar ratio of said phosphorus compound represented by formula (I-A) to said aldehyde represented by formula (I-D) is generally 1:1-10, preferably 1:1.5-6.0, more preferably 1:2-4, but it is not limited thereto in some cases.

According to the present invention, in said reaction step, the addition manner of reaction materials is not particularly limited. For example, the reaction material can be added in one portion, in batch or dropwisely.

According to the present invention, in said reaction step, the addition sequence of reaction materials is not particularly limited. Specifically for example, the addition in the sequence of said phosphorus compound represented by formula (I-A), said amine compound represented by formula (I-B), said benzotriazole compound represented by formula (I-C) and said aldehyde represented by formula (I-D) may be exemplified, or the reaction materials can be added in any sequence.

According to the present invention, said reaction step can be carried out in presence of diluent and/or solvent or in absence of diluent and/or solvent.

According to the present invention, in said reaction step, for example, as said diluent, for example one or more of polyolefin, mineral base oil and polyether may be exemplified. As said mineral base oil, for example API I, II, III-type mineral base oil for lubricating oil may be exemplified, more specifically for example a mineral base oil for lubricating oil having a viscosity of 20-120 centistokes (cSt) and a viscosity index of at least 50 or more at 40° C. may be exemplified, more specifically for example a mineral base oil for lubricating oil having a viscosity of 28-110 centistokes (cSt) and a viscosity index of at least 80 or more at 40° C. may be exemplified. As said polyolefin, for example one or more of polyolefins obtained by homopolymerization of ethene, propene or $C_4$-$C_{10}$ α-olefin or copolymerization of two or more of the above olefins may be exemplified, preferably one or more of poly alpha-olefins (PAO) having a viscosity of 2-25 centistokes (cSt) at 100° C. (preferably having a viscosity of 6-10 centistokes (cSt) at 100° C.). Among others, as said $C_4$-$C_{10}$ α-olefin, for example n-butene, iso-butene, n-pentene, n-hexene, n-octene and n-decene may be exemplified. In addition, said polyolefin has a number-average molecular weight (Mn) of generally 500-3000, preferably 500-2500, most preferably 500-1500. As said polyether, for example a polymer formed by reacting an alcohol and an epoxide may be exemplified. As said alcohol, for example ethylene glycol and/or 1,3-propylene glycol may be exemplified. As said epoxide, for example ethylene oxide and/or propylene oxide may be exemplified. In addition, said polyether has a number-average molecular weight (Mn) of generally 500-3000, preferably 700-3000, most preferably 1000-2500. Only one of these diluents can be used, or two or more of these diluentes can also be used in combination.

According to the present invention, in said reaction step, for example, as said solvent for example $C_{2-10}$aliphatic nitrile (such as acetonitrile or the like), $C_{6-20}$aromatic hydrocarbon (such as benzene, toluene, xylene and isopropyl benzene), $C_{6-10}$alkane (such as n-hexane, cyclohexane and petroleum ether), $C_{1-6}$aliphatic alcohol (such as methyl alcohol, ethyl alcohol, n-propyl alcohol, isopropyl alcohol, n-butyl alcohol and ethylene glycol), $C_{2-20}$halogenated hydrocarbon (such as dichloromethane, carbon tetrachloride, chlorobenzene and 1,2-dichlorobenzene), $C_{3-10}$ketone (such as acetone, butanone and methyl-isobutanone) or $C_{3-10}$amide (such as dimethylformamide, dimethylacetamide and N-methylpyrrolidone) or the like may be exemplified. These solvents can be used in form of a single compound or in form of a combination of two or more compounds.

According to a special embodiment of the present invention, said diluent and/or solvent can be added in an amount that is conventionally used in the art at any stage of the reaction steps without any particular limitation.

According to the present invention, it is obvious that said reaction steps are generally carried out in the protection of an inert gas atmosphere. As said inert gas, for example nitrogen and argon and the like may be exemplified without any particular limitation.

According to the present invention, after the completion of the preparation process of said benzotriazole derivative, water and the solvent (if any) are removed from the finally obtained reaction mixture through any known conventional manner to produce the benzotriazole derivative. Therefore, the present invention also relates to a benzotriazole derivative produced with the aforesaid preparation process for the benzotriazole derivative according to the present invention.

According to the present invention, through the aforesaid preparation process for the benzotriazole derivative, as reaction product, a single benzotriazole derivative, or a mixture of several benzotriazole derivatives, or a mixture of one or more said benzotriazole derivatives and the aforesaid diluent (if used) can be produced. These reaction products are all expected in the present invention, and their different existence manners will not affect the achievement of the effect of the present invention. Therefore, in the context of the present description, these reaction products are indiscriminately called by a joint name of benzotriazole derivative. Therefore, according to the present invention, there is not any absolute necessity to further purify the reaction product or further separate a benzotriazole derivative having a special structure from the reaction product. Of course, the purification or separation is preferable from the viewpoint of further improving the expected effect of the present invention, but is not essential for the present invention. Nevertheless, as said purification or separation method, for example the purification or separation or the like of the reaction product through column chromatography or preparative chromatography may be exemplified.

The benzotriazole derivative of the present invention is particularly suitable in the production of anti-wear agent or suitably used as anti-wear agent, in particular, the anti-wear additive for lubricating oil. The anti-wear agent of the present invention not only has an excellent extreme-pressure and anti-wear properties, but also has one or more excellent properties of thermal oxidation stability, corrosion resistance, rust resistance and anti-friction performance. According to a particularly preferable embodiment of the present invention, said anti-wear agent not only has excellent extreme-pressure and anti-wear properties, but also has excellent properties of thermal oxidation stability, corrosion resistance, rust resistance and anti-friction performance.

According to the present invention, said anti-wear agent comprises any aforesaid benzotriazole derivative of the present invention (or a mixture of benzotriazole derivatives in any ratio) or the benzotriazole derivative produced with the aforesaid preparation process for the benzotriazole derivative according to the present invention.

According to the present invention, in order to produce said anti-wear agent, the aforesaid diluent or other components that are conventionally used to produce the anti-wear agent in the art can be further added to said benzotriazole derivative. For this, said diluent can be used alone, or two or more diluents can be used in combination. Of course, if the benzotriazole derivative of the present invention has contained a certain amount of said diluent after the aforesaid preparation process, the addition amount of said diluent can be accordingly decreased, and the benzotriazole derivative can even be directly used as the anti-wear agent without the need of further adding said diluent, which is obvious to those skilled in the art.

Generally, in the anti-wear agent of the present invention, on the weight basis, said benzotriazole derivative comprises 5%-100%, preferably 30%-90% by the total weight of said anti-wear agent.

According to the present invention, in order to produce said anti-wear agent, for example, said benzotriazole derivative, said diluent and said other component(s) (if any) are mixed at 20° C.-60° C. for 1 h-6 h without any particular limitation.

Since the aforesaid diluent used in the present invention is actually often used as base oil for lubricating oil in the art, therefore in the following description, it will be directly classified into the base oil for lubricating oil and will not be described as one separate component.

The benzotriazole derivative or the anti-wear agent of the present invention is also particularly suitable to produce a lubricating oil composition. Therefore, the present invention further relates to a lubricating oil composition, which at least comprises any aforesaid benzotriazole derivative of the present invention (or a mixture of benzotriazole derivatives in any ratio) or the benzotriazole derivative produced with the aforesaid preparation process for the benzotriazole derivative according to the present invention or the aforesaid anti-wear agent of the present invention, and the base oil for lubricating oil.

According to the present invention, for example, on the weight basis, said benzotriazole derivative is 0.001-30%, preferably 0.1-10% by the total weight of said lubricating oil composition.

According to the present invention, as said base oil for lubricating oil, for example, any base oil for lubricating oil that is conventionally used in the art such as mineral base oil, animal oil, vegetable oil or synthetic base oil or the like may be exemplified. As said mineral base oil, for example a mineral base oil having a viscosity index of >80, or a mineral base oil having a saturated hydrocarbon content of >90 wt % and a sulfur content of <0.03 wt % may be exemplified. As said synthetic base oil, for example polyolefin, synthetic ester, silicone oil and polyether or the like may be exemplified. These base oils for lubricating oil can be used in form of a single compound or in form of a combination of two or more compounds.

According to the present invention, in order to produce said lubricating oil composition, for example, the aforesaid benzotriazole derivative of the present invention (or a mixture of benzotriazole derivatives in any ratio) or the benzotriazole derivative produced with the aforesaid preparation process for the benzotriazole derivative according to the present invention or the aforesaid anti-wear agent of the present invention, as lubricating oil additive, said base oil for lubricating oil and said other lubricating oil additive (used if necessary) are mixed evenly according to the predetermined addition ratio or amount and can be heated (if necessary) without any particular limitation.

More specifically, in order to produce the lubricating oil composition of the present invention, for example, the above mentioned lubricating oil additives can be added respectively to the base oil for lubricating oil, or the above mentioned lubricating oil additives are mixed and concentrated and the resulting concentrate is then added to the base oil for lubricating oil, the mixture is heated and mixed evenly. Herein, for example, the mixing temperature is generally 40° C.-90° C., and the mixing time is generally 1 hr-6 hrs.

According to the present invention, for example, as the addition amount of said benzotriazole derivative or said anti-wear agent, it is such an amount that based on the amount of the benzotriazole derivative, the amount of said benzotriazole derivative or said anti-wear agent (on a weight basis) is 0.001-30%, preferably 0.1-10% by the total weight of said lubricating oil composition.

The lubricating oil composition of the present invention not only has excellent extreme-pressure and anti-wear properties, but also has one or more excellent properties of thermal oxidation stability, corrosion resistance, rust resistance and anti-friction performance. According to a particularly preferable embodiment of the present invention, said lubricating oil composition not only has excellent extreme-pressure and anti-wear properties, but also has excellent properties of thermal oxidation stability, corrosion resistance, rust resistance and anti-friction performance. The lubricating oil composition of the prior art does not possess all of these excellent properties.

EXAMPLES

The present invention will be described in further detail below by way of examples, but the present invention is not limited to the examples.

The properties in the Examples and Comparative Examples were evaluated as follows.

(1) Evaluation of Anti-Wear Property

According to the SH/T 0189 standard method, the lubricating oil composition prepared in Example or Comparative Example is used as the test sample for evaluation of anti-wear property. The anti-wear test is carried out in the following conditions: the applied force is 392 N (40 kg), the oil bath temperature is 75° C., and the top ball speed is 1200 r/min, and the time is 60 min. The anti-wear property of the sample is evaluated by the average of the wear scar diameters of three balls below.

(2) Evaluation of Extreme Pressure Property

According to the GB/T 12583 standard method, the lubricating oil composition prepared in Example or Comparative Example is used as the test sample for evaluation of extreme pressure property. The test condition includes the spindle rotation speed is 1760 r/min, and the sample temperature is 18-35° C. The load is increased from 784N in an open and stepwise manner, and a series of 10-second tests are carried out, in which the wear scar diameters are measured and recorded, until the sintering occurs. The load used when the sintering occurs is evaluated as the extreme pressure property of the sample.

(3) Evaluation of the Inhibition of Copper Sheet Corrosion

According to the ASTM D130 standard method, the lubricating oil composition prepared in Example or Comparative Example is used as the test sample for a copper sheet corrosion test. The polished copper sheet is immersed in the sample, heated to a test temperature of 121° C. for 3 hours, and after the end of the test, the copper sheet is taken out, and after washing, it is compared with a corrosion standard color plate to determine the corrosion level.

(4) Evaluation of Rust Resistance

According to the GB/T 11143 standard method, the lubricating oil composition prepared in Example or Comparative Example is used as the test sample for a copper sheet corrosion test. 300 mL of the sample and 30 mL of distilled water are mixed, and the test steel bars are all immersed therein, and stirred at 60° C. for 24 hours. At the end of the test, the rust marks and the rust degree of the test steel bars are observed.

(5) Thermal Oxidation Stability

The lubricating oil composition prepared in Example or Comparative Example is used as the test sample to evaluate the thermal oxidation stability of the test sample through a pressured differential scanning calorimetry test (PDSC). The stability is expressed by the oxidation induction period of the sample (unit: min). The PDSC test condition comprises: temperature=180° C., pressure=0.5 MPa, and oxygen flow rate=100 mL/min.

(6) Evaluation of Anti-Friction Performance of High Frequency Reciprocating Friction Test The lubricating oil composition prepared in Example or Comparative Example is used as the test sample for a high frequency reciprocating friction test. The test condition of the method comprises: load=1000 g, frequency=20 Hz, temperature=100° C., test time=60 mins. The friction coefficient is recorded. The smaller the friction coefficient is, the better the anti-friction performance of the test sample is.

Example 1

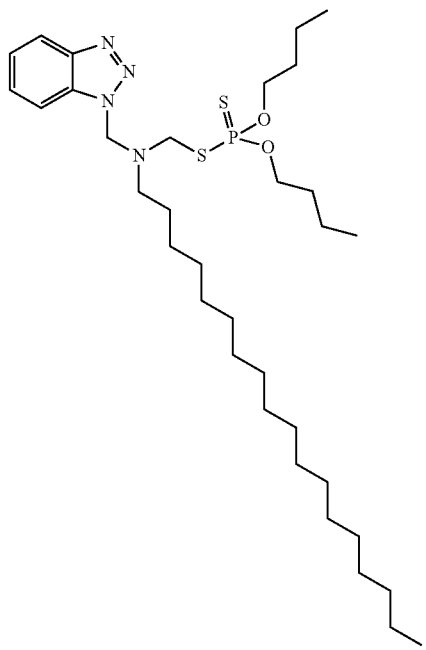

Under the nitrogen protection, to a 250 mL four-neck flask provided with a stirrer, a thermometer, a condenser and a water separator were added 31.26 g (116 mmol) octadecylamine and 6.36 g (212 mmol) paraform, 9.05 g (76 mmol) benzotriazole and 25.41 g (105 mmol) di-n-butyldithiophosphoric acid. The mixture was rapidly stirred, warmed up to 100° C. and reacted for 3 h. After the reaction completion, the reaction mixture was distillated under vacuum to remove the residual water, cooled to room temperature, settled for 24 hours, filtered to remove the impurity, and separated by column chromatography to produce the final product.

The characterization data of the product were as follows:

$^1$H NMR (300 MHz, CDCl$_3$): δ 0.88 (3H), 1.03-1.71 (46H), 2.61-3.93 (6H), 4.22-4.54 (2H), 5.20-6.15 (2H), 7.18-8.08 (4H);

$C_{34}H_{63}N_4O_2PS_2$ calculated C, 62.35, H, 9.70, N, 8.55, O, 4.89, P, 4.73, S, 9.79; measured: C, 63.25, H, 10.0, N, 8.45, O, 4.89, P, 4.41, S, 9.32.

Example 2

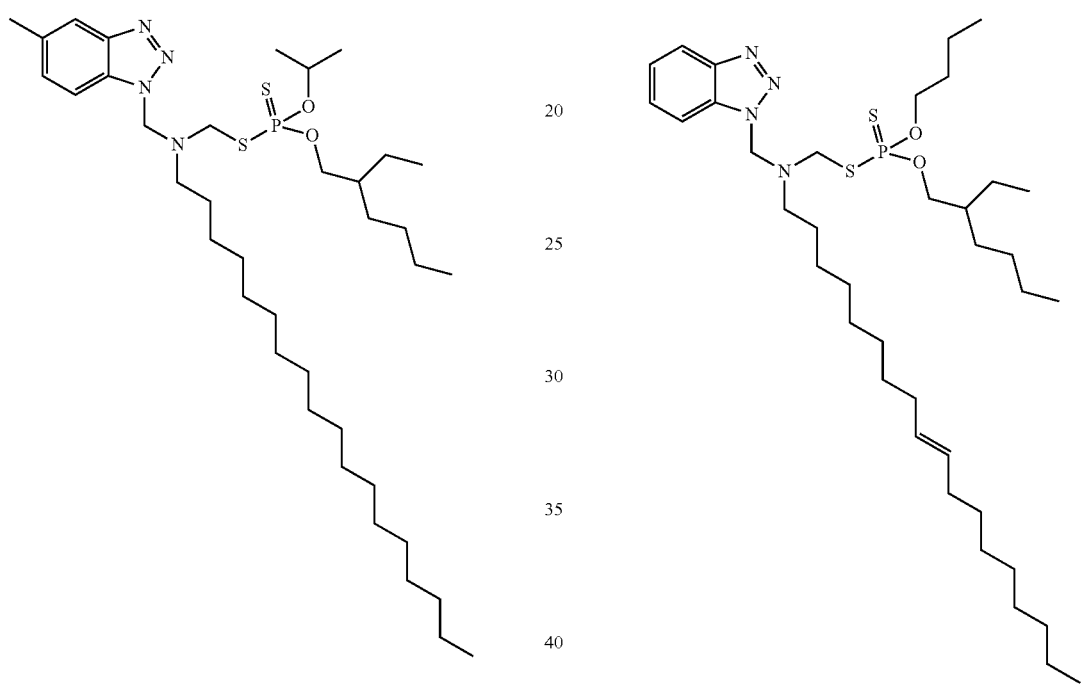

Under the nitrogen protection, to a 500 mL four-neck flask provided with a stirrer, a thermometer, a condenser and a water separator were added 60.10 g (223 mmol) octadecylamine and 18.3 g (610 mmol) paraform and 30.60 g (230 mmol) 5-methylbenzotriazole. The mixture was rapidly stirred and warmed up to 85° C. 71.31 g (251 mmol) isopropyl-2-ethylhexyldithiophosphoric acid was dropwisely added. The resulting mixture was thermostatically reacted for 6 h. After the reaction completion, the reaction mixture was distillated under vacuum to remove the residual water, cooled to room temperature, settled for 24 hours, filtered to remove the impurity, and separated by column chromatography to produce the final product.

The characterization data of the product were as follows:

$^1$H NMR (300 MHz, CDCl$_3$): δ 0.88 (9H), 1.08-1.71 (47H), 2.43-3.93 (7H), 4.22-4.54 (2H), 4.74 (1H), 5.20-6.21 (2H), 7.39-7.75 (3H);

$C_{38}H_{71}N_4O_2PS_2$ calculated C, 64.18, H, 10.06, N, 7.88, O, 4.50, P, 4.36, S, 9.02; measured: C, 63.93, H, 9.85, N, 7.75, O, 4.50, P, 4.66, S, 9.31.

Example 3

Under the nitrogen protection, to a 250 mL four-neck flask provided with a stirrer, a thermometer, a condenser and a water separator were added 23.01 g (86 mmol) oleylamine and 20.27 g (250 mmol) formalin, 12.51 g (105 mmol) benzotriazole and 32.79 g (110 mmol) n-butyl-2-ethylhexyldithiophosphoric acid. The mixture was rapidly stirred, warmed up to 90° C. and reacted for 5 h. After the reaction completion, the reaction mixture was distillated under vacuum to remove the residual water, cooled to room temperature, settled for 24 hours, filtered to remove the impurity, and separated by column chromatography to produce the final product.

The characterization data of the product were as follows:

$^1$H NMR (300 MHz, CDCl$_3$): δ 0.88 (9H), 1.03-1.72 (40H), 2.12-3.93 (10H), 4.20-4.54 (2H), 5.18-6.17 (4H), 7.18-8.08 (4H);

$C_{38}H_{69}N_4O_2PS_2$ calculated C, 64.37, H, 9.81, N, 7.90, O, 4.51, P, 4.37, S, 9.04; measured: C, 64.57, H, 10.05, N, 7.54, O, 4.37, P, 4.42, S, 9.05.

Example 4

Example 5

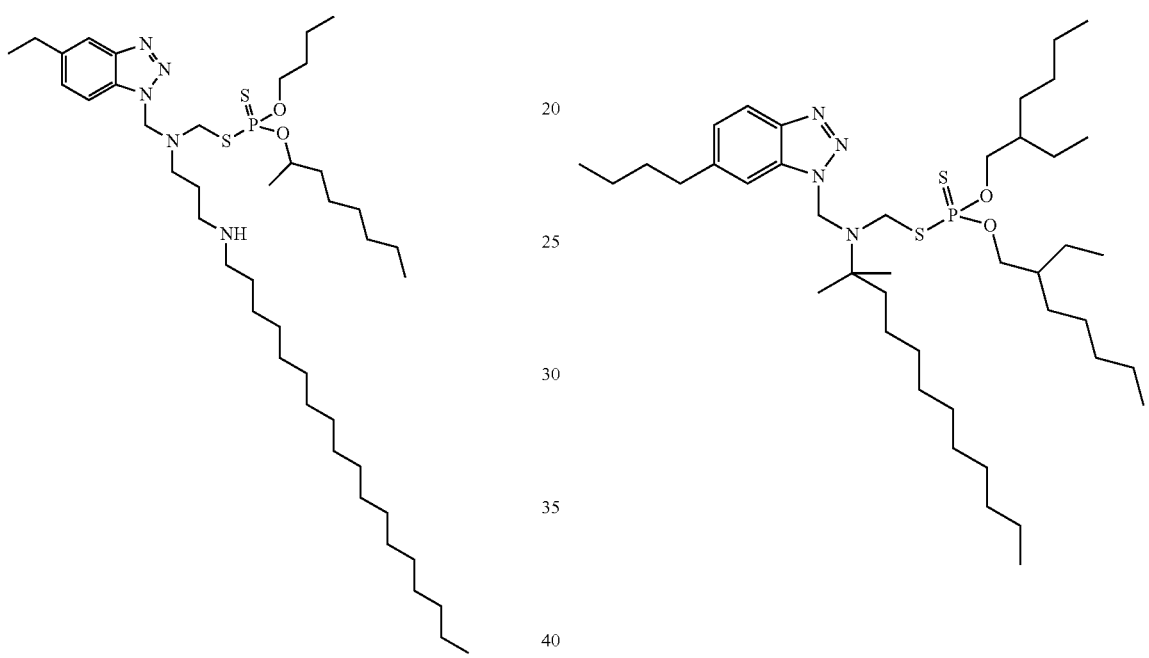

Under the nitrogen protection, to a 500 mL four-neck flask provided with a stirrer, a thermometer, a condenser and a water separator were added 133.81 g (410 mmol) octadecylpropylene diamine and 25.8 g (860 mmol) paraform, 55.89 g (380 mmol) 5-ethylbenzotriazole and 134.15 g (450 mmol) n-butyl-1-methylheptyldithiophosphoric acid. The mixture was rapidly stirred, warmed up to 110° C. and reacted for 4 h. After the reaction completion, the reaction mixture was distillated under vacuum to remove the residual water, cooled to room temperature, settled for 24 hours, filtered to remove the impurity, and separated by column chromatography to produce the final product.

The characterization data of the product were as follows:

$^1$H NMR (300 MHz, CDCl$_3$): δ 0.88 (6H), 1.03-1.93 (57H), 2.43-2.74 (8H), 3.46-4.10 (4H), 4.24-4.63 (2H), 5.31-6.20 (2H), 7.19-7.82 (3H);

$C_{43}H_{82}N_5O_2PS_2$ calculated C, 64.86, H, 10.38, N, 8.80, O, 4.02, P, 3.89, S, 8.05; measured: C, 64.57, H, 10.05, N, 7.54, O, 4.37, P, 4.42, S, 9.05.

Under the nitrogen protection, to a 500 mL four-neck flask provided with a stirrer, a thermometer, a condenser and a water separator were added 25.9 g (130 mmol) tertiary carbon primary amine and 13.5 g (450 mmol) paraform, 21.89 g (125 mmol) 6-butylbenzotriazole and 100 mL toluene. The mixture was rapidly stirred and warmed up to 95° C. 55.23 g (150 mmol) di(2-ethylhexyl)dithiophosphoric acid was dropwisely added. The resulting mixture was thermostatically reacted for 5 h. After the reaction completion, the reaction mixture was distillated under vacuum to remove the solvent and the residual water, cooled to room temperature, settled for 24 hours, filtered to remove the impurity, and separated by column chromatography to produce the final product.

The characterization data of the product were as follows:

$^1$H NMR (300 MHz, CDCl$_3$): δ 0.89 (18H), 1.05-1.93 (48H), 2.34-2.50 (2H), 3.43-3.72 (4H), 4.24-4.72 (2H), 5.31-6.20 (2H), 7.19-7.82 (3H);

$C_{42}H_{79}N_4O_2PS_2$ calculated C, 65.75, H, 10.38, N, 7.30, O, 4.17, P, 4.04, S, 8.36; measured: C, 64.50, H, 10.12, N, 7.43, O, 4.32, P, 4.57, S, 9.26.

Example 6

Example 7

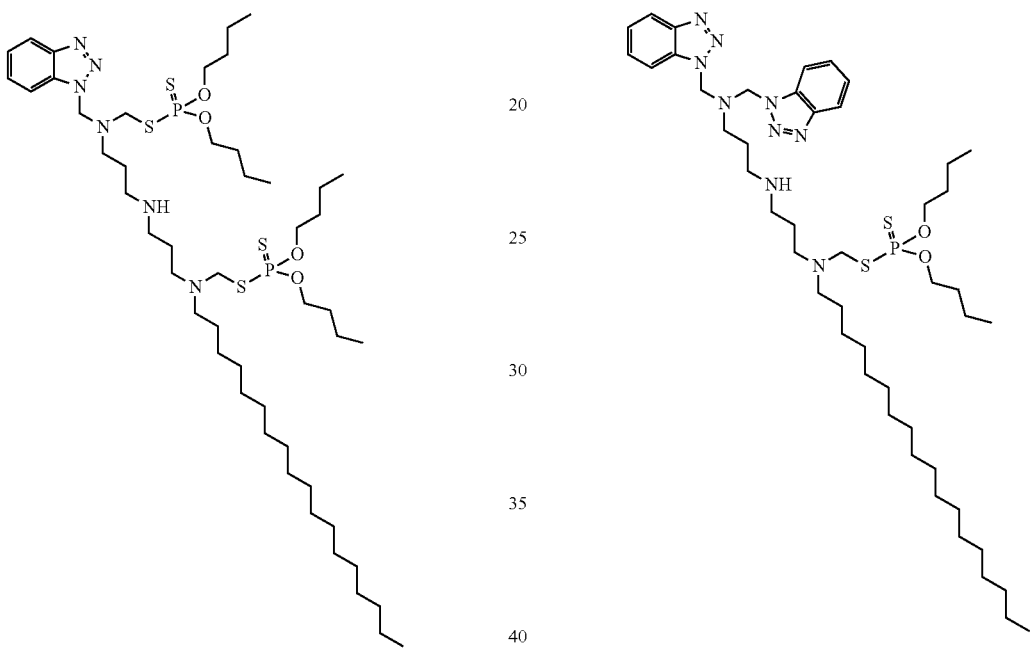

Under the nitrogen protection, to a 500 mL four-neck flask provided with a stirrer, a thermometer, a condenser and a water separator were added 34.47 g (90 mmol) N-hydrogenated tallowalkyl dipropylene triamine and 13.5 g (450 mmol) paraform, 10.16 g (85 mmol) benzotriazole and 100 mL toluene. The mixture was rapidly stirred and warmed up to 100° C. 48.4 g (200 mmol) di-n-butyldithiophosphoric acid was dropwisely added. The resulting mixture was thermostatically reacted for 6 h. After the reaction completion, the reaction mixture was distillated under vacuum to remove the solvent and the residual water, cooled to room temperature, settled for 24 hours, filtered to remove the impurity, and separated by column chromatography to produce the final product.

The characterization data of the product were as follows:
$^1$H NMR (300 MHz, CDCl$_3$): δ 0.88 (3H), 1.03 (12H), 1.06-1.91 (53H), 2.34-3.46 (10H), 3.54-4.57 (12H), 5.23-6.11 (2H), 7.19-8.08 (4H);

$C_{49}H_{96}N_6O_4P_2S_4$ calculated C, 57.50, H, 9.45, N, 8.21, O, 6.25, P, 6.05, S, 12.53; measured: C, 57.42, H, 9.43, N, 8.16, O, 6.35, P, 6.10, S, 12.54.

Under the nitrogen protection, to a 500 mL four-neck flask provided with a stirrer, a thermometer, a condenser and a water separator were added 34.47 g (90 mmol) N-hydrogenated tallowalkyl dipropylene triamine and 13.5 g (450 mmol) paraform, 17.93 g (150 mmol) triazole and 120 mL toluene. The mixture was rapidly stirred and warmed up to 100° C. 24.2 g (100 mmol) di-n-butyldithiophosphoric acid was dropwisely added. The resulting mixture was thermostatically reacted for 8 h. After the reaction completion, the reaction mixture was distillated under vacuum to remove the solvent and the residual water, cooled to room temperature, settled for 24 hours, filtered to remove the impurity, and separated by column chromatography to produce the final product.

The characterization data of the product were as follows:
$^1$H NMR (300 MHz, CDCl$_3$): δ 0.88 (3H), 1.03-1.95 (51H), 2.45-3.30 (9H), 3.54-4.32 (7H), 5.58-6.20 (4H), 7.19-8.08 (8H);

$C_{47}H_{82}N_9O_2PS_2$ calculated C, 62.70, H, 9.18, N, 14.00, O, 3.55, P, 3.44, S, 7.12; measured: C, 62.81, H, 9.22, N, 13.85, O, 3.56, P, 3.41, S, 7.15.

Example 8

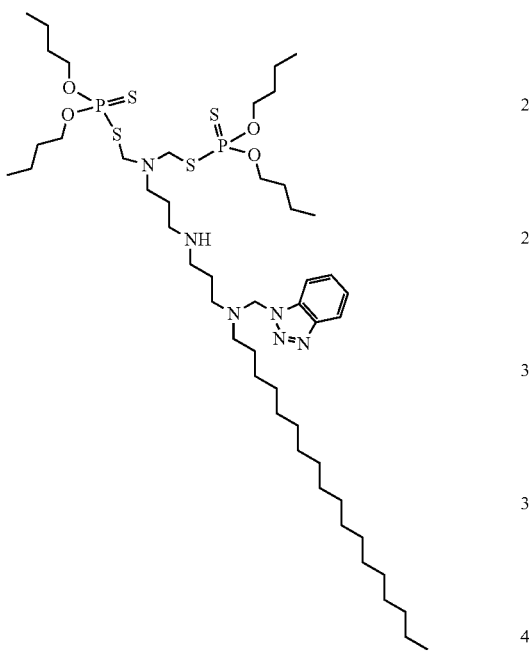

Under the nitrogen protection, to a 500 mL four-neck flask provided with a stirrer, a thermometer, a condenser and a water separator were added 34.47 g (90 mmol) N-hydrogenated tallowalkyl dipropylene triamine and 13.5 g (450 mmol) paraform, 10.16 g (85 mmol) triazole and 100 mL toluene. The mixture was rapidly stirred and warmed up to 100° C. 48.4 g (200 mmol) di-n-butyldithiophosphoric acid was dropwisely added. The resulting mixture was thermostatically reacted for 6 h. After the reaction completion, the reaction mixture was distilled under vacuum to remove the solvent and the residual water, cooled to room temperature, settled for 24 hours, filtered to remove the impurity, and separated by column chromatography to produce the final product.

The characterization data of the product were as follows:
$^1$H NMR (300 MHz, CDCl$_3$): δ 0.88 (3H), 1.03 (12H), 1.06-1.91 (53H), 2.34-3.46 (10H), 3.54-4.28 (12H), 5.23-5.77 (2H), 7.19-8.08 (4H);

$C_{49}H_{96}N_6O_4P_2S_4$ calculated C, 57.50, H, 9.45, N, 8.21, O, 6.25, P, 6.05, S, 12.53; measured: C, 57.62, H, 9.49, N, 8.13, O, 6.22, P, 6.09, S, 12.45.

Example 9

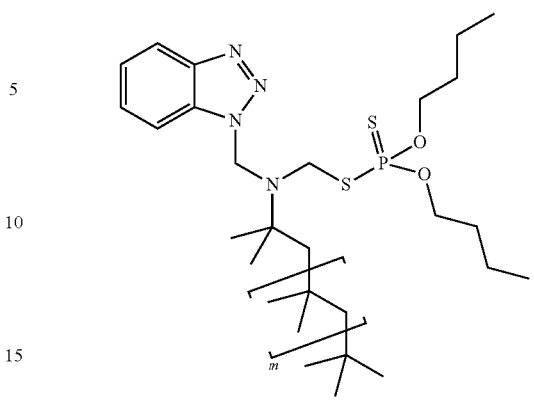

Under the nitrogen protection, to a 500 mL four-neck flask provided with a stirrer, a thermometer, a condenser and a water separator were added 45 g polyisobutylene amine (having a number-average molecular weight of about 600) and 9 g (300 mmol) paraform, 10.16 g (85 mmol) triazole and 150 mL toluene. The mixture was rapidly stirred and warmed up to 100° C. 24.4 g (100 mmol) di-n-butyldithiophosphoric acid was dropwisely added. The resulting mixture was thermostatically reacted for 5 h. After the reaction completion, the reaction mixture was distilled under vacuum to remove the solvent and the residual water, filtered to remove the impurity, and separated by column chromatography to produce the final product.

The characterization data of the product were as follows:
$^1$H NMR (300 MHz, CDCl$_3$): δ 0.86 (9H), 0.97-1.91 (86H), 3.46-4.87 (6H), 5.23-6.35 (2H), 7.19-8.08 (4H);
Elemental Analysis measured: C, 69.91, H, 11.23, N, 5.68, O, 3.35, P, 3.22, S, 6.61.

Example 10

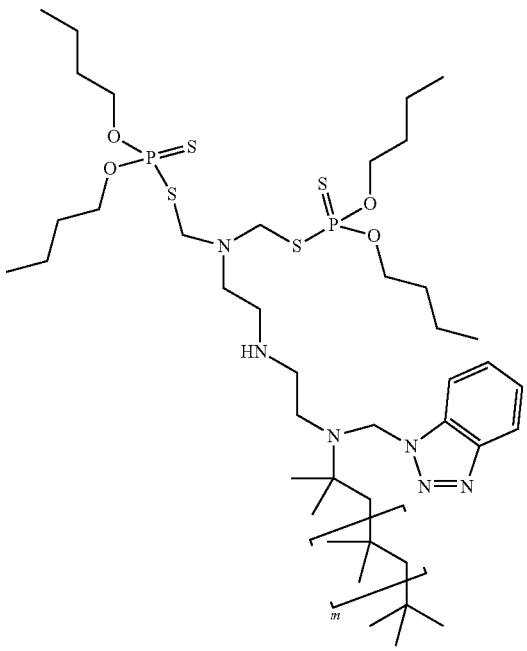

Under the nitrogen protection, to a 500 mL four-neck flask provided with a stirrer, a thermometer, a condenser and a water separator were added 50 g polyisobutylene amine (having a number-average molecular weight of about 600) and 10.8 g (360 mmol) paraform, 10.16 g (85 mmol) triazole and 150 mL toluene. The mixture was rapidly stirred and warmed up to 100° C. 53.24 g (220 mmol) di-n-butyldithiophosphoric acid was dropwisely added. The resulting mixture was thermostatically reacted for 5 h. After the reaction completion, the reaction mixture was distillated under vacuum to remove the solvent and the residual water, filtered to remove the impurity, and separated by column chromatography to produce the final product.

The characterization data of the product were as follows:

$^1$H NMR (300 MHz, CDCl$_3$): δ 0.86 (9H), 0.97-1.75 (101H), 2.54-4.03 (16H), 4.26-5.93 (6H), 7.19-8.08 (4H);

Elemental Analysis measured: C, 63.62, H, 10.55, N, 6.32, O, 4.95, P, 4.68, S, 9.88.

Comparative Example 1

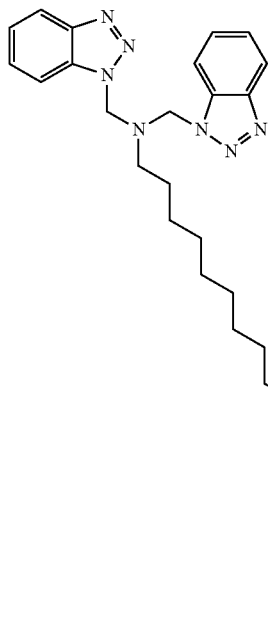

Under the nitrogen protection, to a 250 mL four-neck flask provided with a stirrer, a thermometer, a condenser and a water separator were added 35.04 g (130 mmol) octadecylamine, 9 g (300 mmol) paraform, 29.78 g (250 mmol) benzotriazole and 100 mL toluene. The mixture was rapidly stirred and warmed up to 90° C. The resulting mixture was thermostatically reacted for 6 h. After the reaction completion, the reaction mixture was distillated under vacuum to remove the solvent and the residual water, cooled to room temperature, settled for 24 hours, filtered to remove the impurity to produce the product.

The characterization data of the product were as follows:

$^1$H NMR (300 MHz, CDCl$_3$): δ 0.88 (3H), 1.25-1.51 (32H), 3.27 (2H), 5.55-6.24 (4H), 7.19-8.08 (8H);

C$_{32}$H$_{49}$N$_7$ calculated C, 72.27, H, 9.29, N, 18.44; measured: C, 72.95, H, 10.32, N, 16.73.

Comparative Example 2

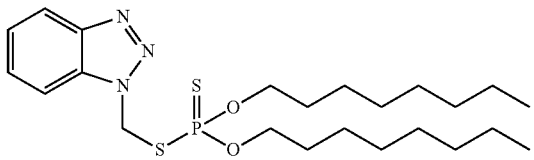

Under the nitrogen protection, to a 250 mL four-neck flask provided with a stirrer, a thermometer, a condenser and a water separator were added 12.51 g (105 mmol) benzotriazole, 7.5 g (250 mmol) paraform, 42.54 g (120 mmol) di-n-octyldithiophosphoric acid and 80 mL toluene. The mixture was rapidly stirred and warmed up to 95° C. The resulting mixture was thermostatically reacted for 4 h. After the reaction completion, the reaction mixture was distillated under vacuum to remove the residual water, cooled to room temperature, settled for 24 hours, filtered to remove the impurity, and separated by column chromatography to produce the final product.

The characterization data of the product were as follows:

$^1$H NMR (300 MHz, CDCl$_3$): δ 0.88 (6H), 1.12-1.75 (24H), 5.66 (2H), 3.59-3.95 (4H), 7.18-8.08 (4H);

C$_{23}$H$_{40}$N$_3$O$_2$PS$_2$ calculated C, 56.88, H, 8.30, N, 8.65, O, 6.59, P, 6.38, S, 13.20; measured: C, 56.94, H, 8.35, N, 8.39, O, 6.64, P, 6.43, S, 13.25.

Comparative Example 3

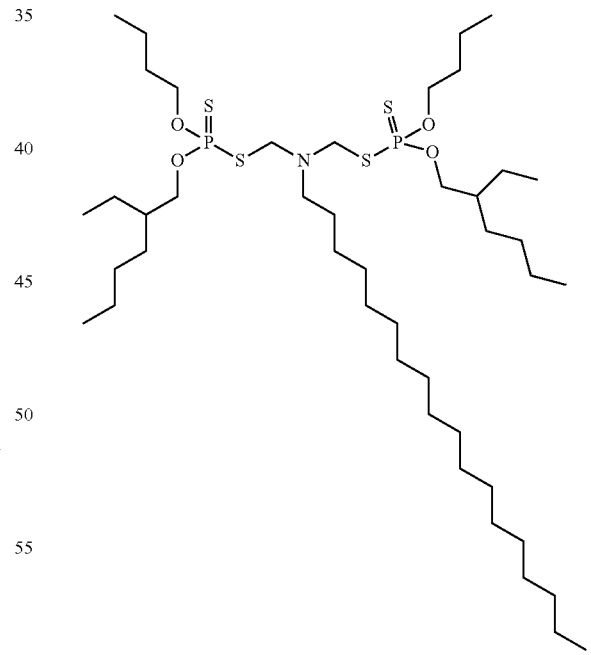

Under the nitrogen protection, to a 250 mL four-neck flask provided with a stirrer, a thermometer, a condenser and a water separator were added 29.65 g (110 mmol) octadecylamine, 9 g (300 mmol) paraform, 65.58 g (220 mmol) n-butyl-2-ethylhexyldithiophosphoric acid. The mixture was rapidly stirred and warmed up to 100° C. The resulting mixture was thermostatically reacted for 5 h. After the reaction completion, the reaction mixture was distillated under vacuum to remove the residual water, cooled to room temperature, settled for 24 hours, filtered to remove the impurity to produce the product.

The characterization data of the product were as follows:

$^1$H NMR (300 MHz, CDCl$_3$): δ 0.90 (21H), 1.11-1.23 (22H), 1.33-1.68 (36H), 2.34-3.95 (10H), 4.13-4.22 (4H);

$C_{44}H_{93}NO_4P_2S_4$ calculated C, 59.35, H, 10.53, N, 1.57, O, 7.19, P, 6.96, S, 14.40; measured: C, 59.03, H, 10.43, N, 1.47, O, 7.28, P, 7.08, S, 14.61.

Example I-1 to Example I-13 and Comparative Example I-1 to Comparative Example I-10

The products obtained in Examples, the products obtained in the Comparative Examples, and the additives as control are mixed the base oil for lubricating oil at 40° C. for 2 h according to the proportions listed in Table 1 to produce the lubricating oil compositions of Example I-1 to Example I-13, the lubricating oil composition of Comparative Example I-1 to Comparative Example I-10 and the blank. Said base oil for lubricating oil is II-type hydrogenation base oil from Shanghai Gaoqiao Petroleum Chemical Company, and said benzotriazole aliphatic amine salt is available as the trade name of T406 from Shangdong Zibo Huihua Chemical Co, Ltd.

TABLE 1

| lubricating oil composition | Additives | Addition amount (wt %) | Appearance of oil sample at room temperature |
|---|---|---|---|
| Example I-1 | Product of Example 1 | 1.0% | transparent |
| Example I-2 | Product of Example 2 | 0.8% | transparent |
| Example I-3 | Product of Example 3 | 0.9% | transparent |
| Example I-4 | Product of Example 4 | 0.8% | transparent |
| Example I-5 | Product of Example 5 | 0.7% | transparent |
| Example I-6 | Product of Example 2 | 1.0% | transparent |
| Example I-7 | Product of Example 5 | 1.0% | transparent |

TABLE 1-continued

| lubricating oil composition | Additives | Addition amount (wt %) | Appearance of oil sample at room temperature |
|---|---|---|---|
| Example I-8 | Product of Example 1:Product of Example 3 = 1:1 | 1.0% | transparent |
| Example I-9 | Product of Example 6 | 0.8% | transparent |
| Example I-10 | Product of Example 7 | 1.0% | transparent |
| Example I-11 | Product of Example 8 | 0.9% | transparent |
| Example I-12 | Product of Example 9 | 1.0% | transparent |
| Example I-13 | Product of Example 10 | 1.0% | transparent |
| Comparative Example I-1 | Benzotriazole | 1.0% | turbid, insoluble |
| Comparative Example I-2 | octadecylamine | 1.0% | turbid, insoluble |
| Comparative Example I-3 | di-n-octyldithiophosphoric acid | 1.0% | transparent |
| Comparative Example I-4 | benzotriazole:octadecylamine:di-n-octyldithiophosphoric acid = 1:1:8 | 1.0% | turbid, insoluble |
| Comparative Example I-5 | Product of Comparative Example 1 | 1.0% | turbid, insoluble |
| Comparative Example I-6 | Product of Comparative Example 2 | 1.0% | transparent |
| Comparative Example I-7 | Product of Comparative Example 3 (dialkyldithiophosphoric acid-formaldehyde-aliphatic amine condensate) | 1.0% | transparent |
| Comparative Example I-8 | benzotriazole octadecylamine salt | 1.0% | turbid, insoluble |
| Comparative Example I-9 | Product of Comparative Example 1:Product of Comparative Example 3 = 1:9 | 1.0% | transparent |
| Comparative Example I-10 | Product of Comparative Example 3:benzotriazole octadecylamine salt = 19:1 | 1.0% | transparent |
| blank | No | — | transparent |

The lubricating oil compositions of Example I-1 to Example I-13, the lubricating oil composition of a part of Comparative Examples and said blank were used as test sample and evaluated for the anti-wear property, the extreme-pressure property, the inhibition of copper sheet corrosion, the rust resistance, the thermal oxidation stability and the anti-friction performance. The test results were shown in Table 2.

TABLE 2

| Lubricating oil composition | four ball experiment wear scar diameter/mm | four ball experiment seizure load $P_B$/N | PDSC oxidation induction period/min | high frequency reciprocating friction test friction coefficient | Rust test result | copper sheet corrosion test, grade |
|---|---|---|---|---|---|---|
| Example I-1 | 0.43 | 981 | 18.3 | 0.054 | no rust | 1a |
| Example I-2 | 0.41 | 932 | 16.5 | 0.056 | no rust | 1a |
| Example I-3 | 0.39 | 1020 | 17.9 | 0.053 | no rust | 1a |
| Example I-4 | 0.38 | 1069 | 15.3 | 0.055 | no rust | 1a |
| Example I-5 | 0.41 | 981 | 14.7 | 0.056 | no rust | 1a |
| Example I-6 | 0.39 | 1069 | 17.5 | 0.055 | no rust | 1a |
| Example I-7 | 0.38 | 1069 | 16.8 | 0.054 | no rust | 1a |
| Example I-8 | 0.42 | 981 | 15.1 | 0.056 | no rust | 1a |
| Example I-9 | 0.39 | 1069 | 16.8 | 0.052 | no rust | 1a |
| Example I-10 | 0.43 | 981 | 17.2 | 0.057 | no rust | 1a |
| Example I-11 | 0.41 | 1069 | 15.4 | 0.054 | no rust | 1a |
| Example I-12 | 0.43 | 981 | 16.9 | 0.056 | no rust | 1a |
| Example I-13 | 0.40 | 1069 | 15.1 | 0.053 | no rust | 1a |
| Comparative Example I-3 | 0.50 | 785 | 10.9 | 0.069 | heavy rust | 4c |
| Comparative Example I-6 | 0.49 | 785 | 12.3 | 0.065 | no rust | 1a |
| Comparative Example I-7 | 0.53 | 785 | 11.5 | 0.060 | heavy rust | 2b |

TABLE 2-continued

| Lubricating oil composition | four ball experiment wear scar diameter/mm | four ball experiment seizure load $P_B$/N | PDSC oxidation induction period/min | high frequency reciprocating friction test friction coefficient | Rust test result | copper sheet corrosion test, grade |
|---|---|---|---|---|---|---|
| Comparative Example I-9 | 0.54 | 785 | 12.5 | 0.063 | no rust | 1b |
| Comparative Example I-10 | 0.67 | 618 | 10.3 | 0.072 | slight rust | 1a |
| blank | 0.93 | 461 | 3.0 | 0.450 | heavy rust | 2b |

The specific embodiments of the present invention have been described in detail above with reference to the embodiments, but it should be understood that the scope of the present invention is not limited by the specific embodiments, but is determined by the appended claims. Those skilled in the art can make appropriate modification to these embodiments without departing from the spirit and scope of the invention, and such modified embodiments are obviously included in the scope of the present invention.

The invention claimed is:

1. A benzotriazole derivative of formula (I):

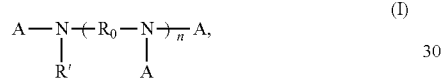

wherein, in formula (I), R' is chosen from a $C_{1-25}$ hydrocarbyl, a $C_{3-25}$ linear or branched heteroalkyl, a hydrocarbyl having a number-average molecular weight Mn of 300-3000, or a polyisobutenyl having a number-average molecular weight Mn of 300-3000; n is an integer of 0-10;
the n $R_0$ groups in formula (I) are identical to or different from each other and each independently is a $C_{1-10}$ linear or branched alkylene; the n+2 A groups in formula (I) are identical to or different from each other and each independently is hydrogen, a group represented by formula (I-1), a group represented by formula (I-2), a $C_{1-25}$ hydrocarbyl, or a hydrocarbyl having a number-average molecular weight Mn of 300-3000, pq,59 provided that at least one of said n+2 A groups in formula (I) is a group represented by formula (I-1), and at least one of said n+2 A groups in formula (I) is a group represented by formula (I-2);
wherein, when said at least one of said n+2 A groups in formula (I) is a $C_{10-25}$ linear or branched alkyl, a $C_{10-25}$ linear or branched alkenyl, or a hydrocarbyl having a number-average molecular weight Mn of 300-3000, is optionally hydrogen,

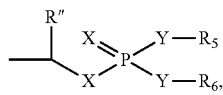

-continued

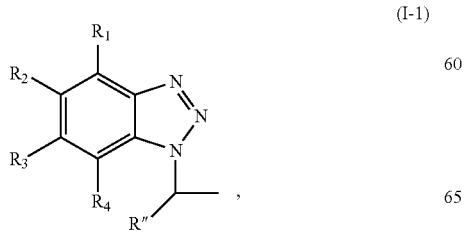

wherein, in formula (I-1) and formula (I-2), $R_5$ and $R_6$ are identical to or different from each other and each independently is a $C_{1-20}$ hydrocarbyl the two Y groups in formula (I-2) are identical to or different from each other and each independently is an oxygen atom or a sulfur atom, the two X groups in formula (I-2) are both sulfur atoms; the two R" groups in formula (I-1) and formula (I-2) are identical to or different from each other and each independently is hydrogen or a $C_{1-20}$ hydrocarbyl; $R_1$, $R_2$, $R_3$, and $R_4$ are identical to or different from each other and each independently is hydrogen or a $C_{1-20}$ hydrocarbyl, and
wherein one of $R_2$ and $R_3$ is a $C_{1-10}$ linear or branched alkyl and the other is hydrogen,
wherein said linear or branched heteroalkyl refers to a group obtained by inserting one or more hetero groups chosen from —O—, —S—, or —NR— (wherein the group R is H or a $C_{1-4}$ linear or branched alkyl) into the carbon chain of a linear or branched alkyl.

2. The benzotriazole derivative according to claim 1, which is

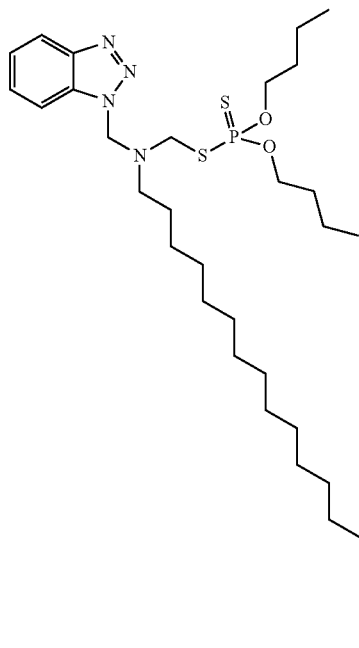

49
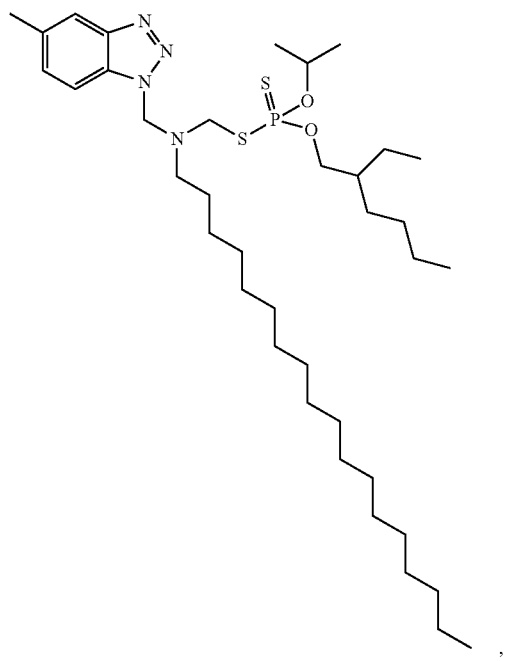
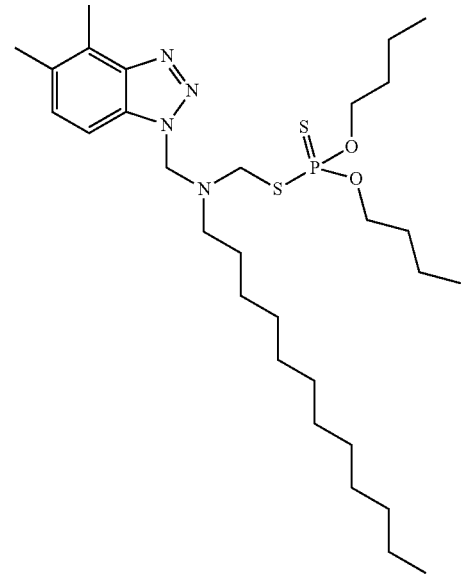
50
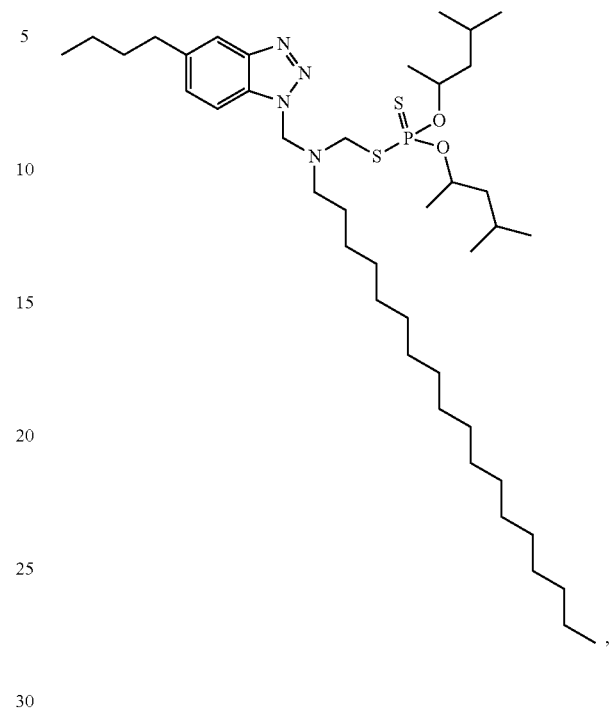
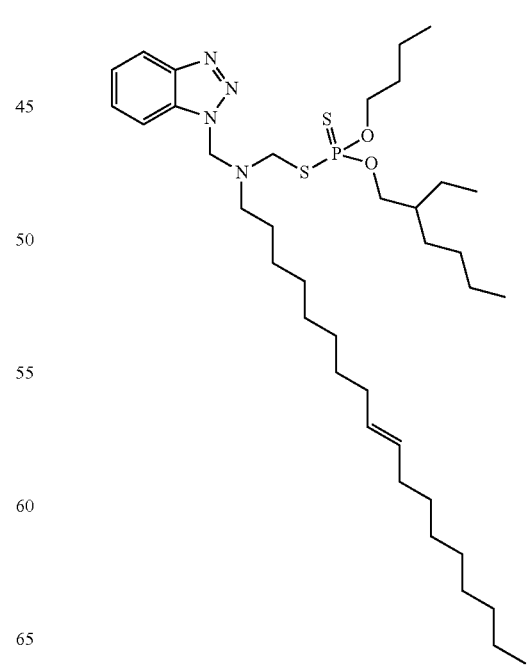

51
-continued
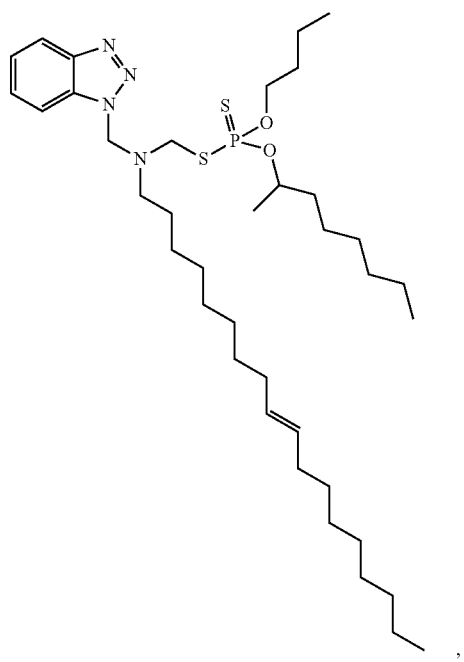
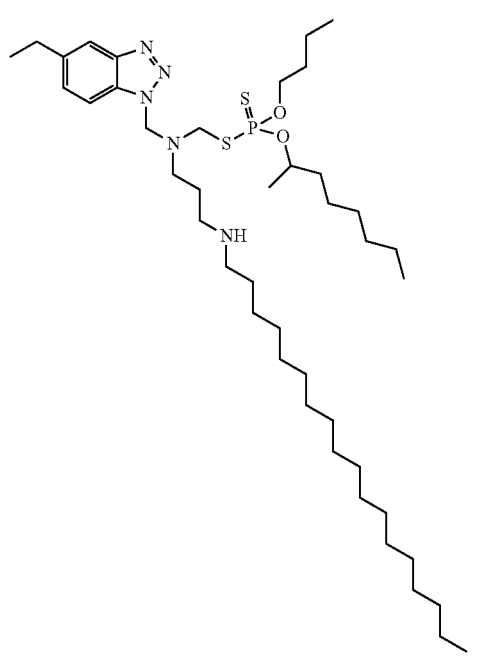 [SMILES: CCCCCCCCCCCCCCCCCCNCCCN(CSP(=S)(OCCCC)OC(C)CCCCCC)Cn1nnc2cc(CC)ccc21]
52
-continued
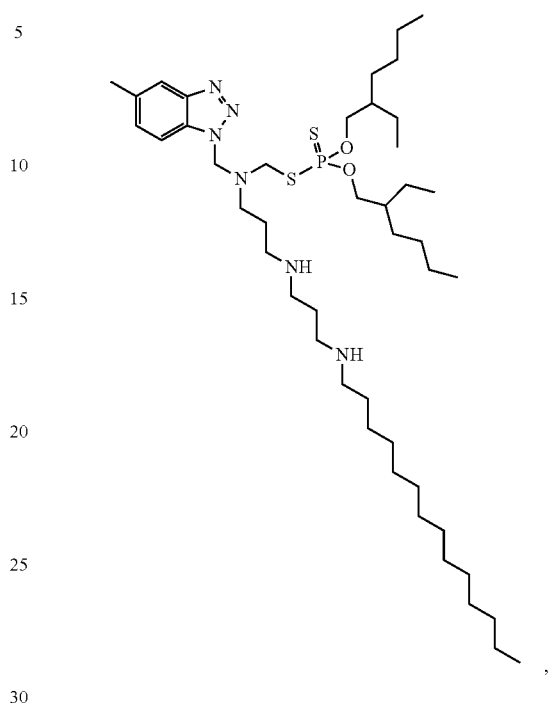
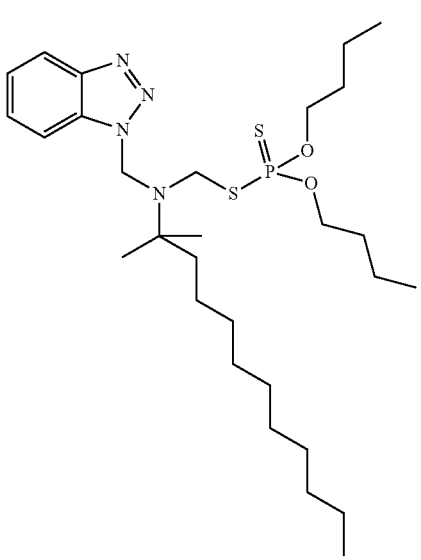

-continued

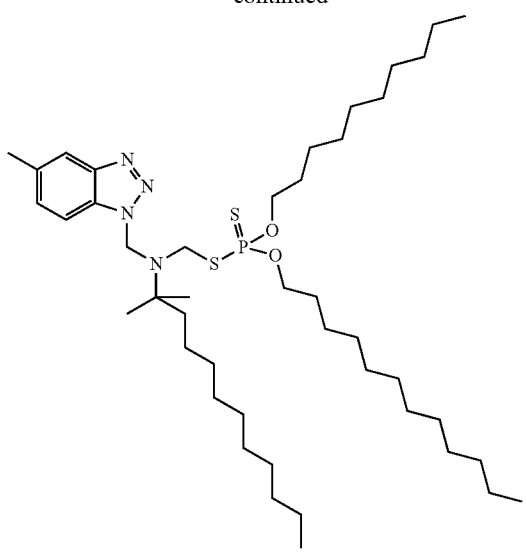

,

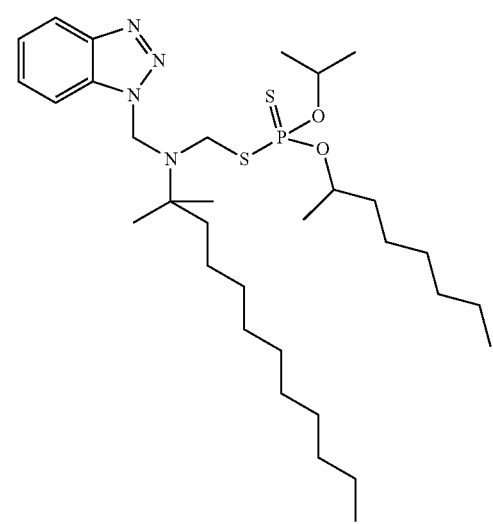

,

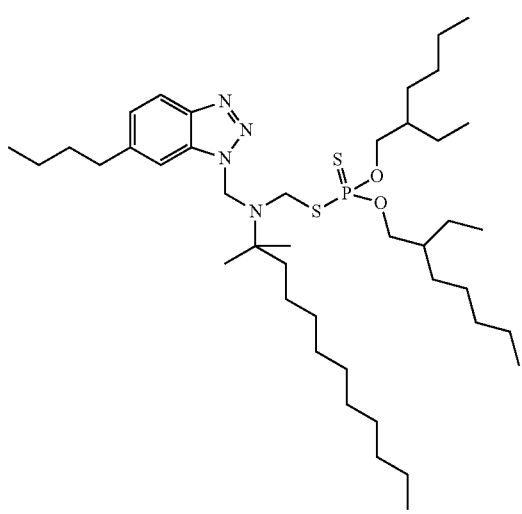 [SMILES: CCCCCCCCCCC(C)(C)N(CSP(=S)(OCC(CC)CCCC)OCC(CC)CCCCC)Cn1nnc2ccc(CCCC)cc21]

or

-continued

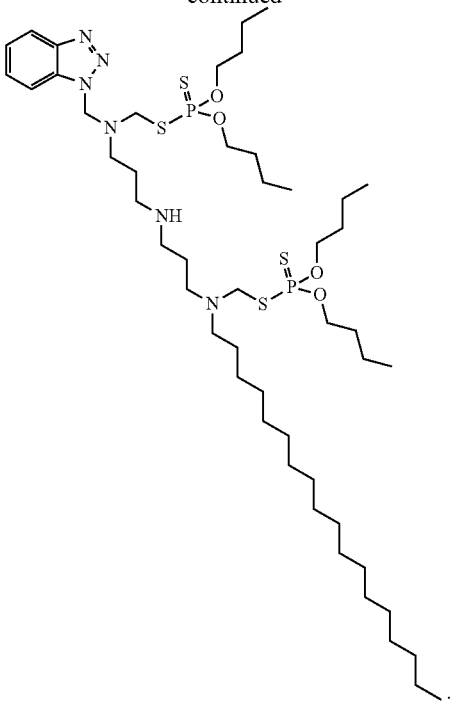

.

3. A process for preparing a benzotriazole derivative, comprising the step of reacting a phosphorus compound represented by formula (I-A), an amine compound represented by formula (I-B), and a benzotriazole compound represented by formula (I-C) in presence of an aldehyde represented by formula (I-D),

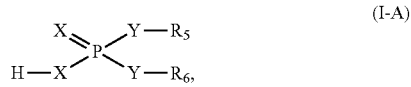 (I-A)

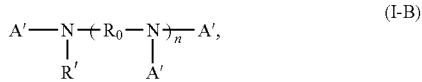 (I-B)

(I-C)

(I-D)

$$R''-\overset{O}{\underset{}{C}}H,$$

wherein R' is chosen from a $C_{1-25}$ hydrocarbyl, a $C_{3-25}$ linear or branched heteroalkyl, a hydrocarbyl having a number-average molecular weight Mn of 300-3000; n is an integer of 0-10; the n $R_0$ groups in formula (I-B) are identical to or different from each other and each independently is a $C_{1-10}$ linear or branched alkylene; the n+2 A' groups in formula (I-B) are identical to or different from each other and each independently is hydrogen, a $C_{1-25}$ hydrocarbyl, or a hydrocarbyl having a number-average molecular weight Mn of 300-3000, provided that at least two of said n+2 A' groups in formula (I-B) represent hydrogen; when at least one of said n+2 A' groups in formula (I-B) is a $C_{10-25}$ linear or branched alkyl, a $C_{10-25}$ linear or branched alkenyl, or a hydrocarbyl having a number-average molecular weight Mn of 300-3000, said group R' is optionally hydrogen; $R_5$ and $R_6$ are identical to or different from each other and each independently is a $C_{1-20}$ hydrocarbyl; the two Y groups in formula (I-A) are identical to or different from each other and each independently is an oxygen atom or a sulfur atom, the two X groups in formula (I-A) are both sulfur atoms; R" is hydrogen and a $C_{1-20}$ hydrocarbyl; $R_1$, $R_2$, $R_3$, and $R_4$ are identical to or different from each other and each independently is hydrogen or a $C_{1-20}$ hydrocarbyl, and one of $R_2$ and $R_3$ is a $C_{1-10}$ linear or branched alkyl, the other is hydrogen, said linear or branched heteroalkyl refers to a group obtained by inserting one or more hetero groups chosen from —O—, —S— or —NR— (wherein the group R is H or a $C_{1-4}$ linear or branched alkyl) into the carbon chain of a linear or branched alkyl.

4. The preparation process according to claim 3, wherein the reaction time of said reaction is 0.1-24 h, and the reaction temperature of said reaction is 0-250° C.

5. The preparation process according to claim 3, wherein a molar ratio of said phosphorus compound represented by formula (I-A) to said amine compound represented by formula (I-B) is 1:0.1-10; a molar ratio of said phosphorus compound represented by formula (I-A) to said benzotriazole compound represented by formula (I-C) is 1:0.1-10; and a molar ratio of said phosphorus compound represented by formula (I-A) to said aldehyde represented by formula (I-D) is 1:1-10.

6. A method for preparing a lubricating oil, comprising adding the benzotriazole derivative according to claim 1 into a base oil.

7. A lubricating oil composition, containing a base oil for lubricating oil, and the benzotriazole derivative according to claim 1.

8. The lubricating oil composition according to claim 7, wherein on the weight basis, said benzotriazole derivative is 0.001-30% by the total weight of said lubricating oil composition.

9. A method for preparing a lubricating oil, comprising adding the benzotriazole derivative obtained by the preparation process according to claim 3 into a base oil.

10. A lubricating oil composition, containing a base oil for lubricating oil, and the benzotriazole derivative obtained by the preparation process according to claim 3.

* * * * *